US012664261B2

(12) United States Patent
Khan

(10) Patent No.: US 12,664,261 B2
(45) Date of Patent: Jun. 23, 2026

(54) SYSTEMS AND METHODS FOR MONITORING A PLURALITY OF VEHICLES

(71) Applicant: VEHIQILLA INC., Belle River (CA)

(72) Inventor: Ali Jamshed Khan, Belle River (CA)

(73) Assignee: VEHIQILLA INC., Belle River (CA)

( * ) Notice: Subject to any disclaimer, the term of this patent is extended or adjusted under 35 U.S.C. 154(b) by 208 days.

(21) Appl. No.: 18/485,819

(22) Filed: Oct. 12, 2023

(65) Prior Publication Data

US 2024/0078309 A1 Mar. 7, 2024

Related U.S. Application Data

(63) Continuation of application No. PCT/CA2022/050556, filed on Apr. 11, 2022.

(60) Provisional application No. 63/174,618, filed on Apr. 14, 2021.

(51) Int. Cl.
*G06F 21/55* (2013.01)
*G06F 21/57* (2013.01)

(52) U.S. Cl.
CPC .......... *G06F 21/552* (2013.01); *G06F 21/577* (2013.01)

(58) Field of Classification Search
CPC .............................. G06F 21/552; G06F 21/577
See application file for complete search history.

(56) References Cited

U.S. PATENT DOCUMENTS

| | | | |
|---|---|---|---|
| 7,599,769 B2 | 10/2009 | Nou | |
| 9,282,110 B2 | 3/2016 | Zhang et al. | |

| | | | | |
|---|---|---|---|---|
| 10,232,823 B1 | 3/2019 | Bobay et al. | |
| 10,382,466 B2 * | 8/2019 | Ostergaard | ................ H02P 6/34 |
| 10,516,681 B2 | 12/2019 | Ruvio et al. | |
| 10,846,166 B2 | 11/2020 | Sonalker et al. | |
| 10,932,135 B2 | 2/2021 | Han et al. | |
| 11,539,724 B2 | 12/2022 | Appel et al. | |
| 11,546,353 B2 | 1/2023 | Ahire et al. | |
| 11,618,414 B2 | 4/2023 | Asmar | |
| 11,755,713 B2 | 9/2023 | Ben-Noon et al. | |
| 2017/0021802 A1 | 1/2017 | Mims | |

(Continued)

FOREIGN PATENT DOCUMENTS

WO 2019227076 A1 11/2019

OTHER PUBLICATIONS

International Preliminary Report on Patentability mailed Oct. 26, 2023 in PCT/CA2022/050556.

*Primary Examiner* — Linglan Edwards
*Assistant Examiner* — Kamryn J. Gillespie

(57) ABSTRACT

Systems and methods for monitoring a plurality of vehicles are provided. The method involves operating at least one processor to: determine, based on cyber risk data corresponding to a plurality of ECU models, a cyber risk score for each ECU model; receive, from each of the vehicles, one or more security logs; map, for each security log, i.) the ECU model of the ECU that recorded the security log, and ii.) the cyber risk score of the ECU model corresponding to the security log; detect a cybersecurity threat in at least some of the vehicles based on i.) at least one event in at least one security log, and ii.) at least one cyber risk score corresponding to the at least one security log; and in response to detecting the cybersecurity threat, transmit an alert indicating at least one vehicle corresponding to the at least one security log.

23 Claims, 19 Drawing Sheets

(56)  References Cited

U.S. PATENT DOCUMENTS

| | | | |
|---|---|---|---|
| 2017/0200323 A1* | 7/2017 | Allouche | G07C 5/008 |
| 2018/0351980 A1* | 12/2018 | Galula | H04W 12/12 |
| 2020/0389474 A1 | 12/2020 | Levy et al. | |
| 2021/0203682 A1* | 7/2021 | Bajpai | H04L 63/0435 |
| 2021/0258328 A1* | 8/2021 | Appel | H04L 67/12 |
| 2021/0306361 A1* | 9/2021 | Tanaka | H04L 63/1416 |
| 2021/0349997 A1* | 11/2021 | Hirano | G06F 21/316 |

* cited by examiner

SYSTEMS AND METHODS FOR MONITORING A PLURALITY OF VEHICLES

CROSS-REFERENCE TO RELATED PATENT APPLICATION

This application is a continuation of PCT/CA2022/050556, filed on Apr. 11, 2022, which claims the benefit of U.S. Provisional Application No. 63/174,618, filed on Apr. 14, 2021. The complete disclosure of each of PCT/CA2022/050556 and U.S. Provisional Application No. 63/174,618 is incorporated herein by reference.

FIELD

The described embodiments generally relate to vehicle monitoring and, in particular, to vehicle monitoring for cybersecurity.

BACKGROUND

The following is not an admission that anything discussed below is part of the prior art or part of the common general knowledge of a person skilled in the art.

As vehicular technologies have developed, vehicles have increasingly incorporated computer systems. For example, some modern automotive vehicles can include more than a hundred electronic control units (ECUs) that electronically monitor and control various vehicular subsystems, such as the engine, transmission, brakes, airbags, locks, etc. However, each of these computer systems may be vulnerable to cyberattacks intended to access information, steal or damage software or hardware, or otherwise cause disruption or misdirection of services. The consequences of a successful cyberattack on a vehicle may be enormous, given the high risk of damage to people and property in the event of an accident. However, it can be difficult to monitor cybersecurity in vehicles.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with an aspect of this disclosure, there is provided a method for monitoring a plurality of vehicles. Each vehicle includes at least one electronic control unit (ECU). Each ECU is operable to monitor at least one vehicular subsystem of the corresponding vehicle. The method involves operating at least one processor to: determine, based on cyber risk data corresponding to a plurality of ECU models, a cyber risk score for each ECU model, the cyber risk score indicating a probability of a cybersecurity threat for the ECU model; receive, from each of the vehicles, one or more security logs, each security log indicating one or more timestamped events recorded by an ECU of the corresponding vehicle; map, for each security log, i.) the ECU model of the ECU that recorded the security log, and ii.) the cyber risk score of the ECU model corresponding to the security log; detect a cybersecurity threat in at least some of the vehicles based on i.) at least one event in at least one security log, and ii.) at least one cyber risk score corresponding to the at least one security log; and in response to detecting the cybersecurity threat, transmit an alert indicating at least one vehicle corresponding to the at least one security log.

In some embodiments, the alert may further indicate at least one ECU model corresponding to the at least one security log.

In some embodiments, the cyber risk data may be received from one or more external data sources.

In some embodiments, cyber risk data may indicate, for each ECU model, at least one cybersecurity control status of i.) the ECU model, and ii.) a manufacturer of the ECU model.

In some embodiments, the cyber risk data may indicate, for each ECU model, known vulnerabilities and breaches associated with the ECU model.

In some embodiments, the method may further involve operating the at least one processor to: for each security log, append a vehicle identifier to the security log, the vehicle identifier identifying the vehicle from which the security log was received. The alert may indicate the at least one vehicle corresponding to the at least one security log based on the corresponding vehicle identifier.

In some embodiments, the cybersecurity threat may be detected further based on the vehicle identifier of the at least one security log.

In some embodiments, the plurality of vehicles may include one or more vehicle fleets, and the method may further involve operating the at least one processor to: for each security log, append a fleet identifier to the security log, the fleet identifier identifying the vehicle fleet of the vehicle from which the security log was received. The alert may further indicate the vehicle fleet corresponding to the at least one security log based on the corresponding fleet identifier.

In some embodiments, the cybersecurity threat may be detected further based on the fleet identifier of the at least one security log.

In some embodiments, the method may further involve operating the at least one processor to: reformat at least some of the security logs so that each security log has the same format.

In some embodiments, the cybersecurity threat is detected in response to determining that at least one event in at least one security log meets a security log condition that is determined based on the at least one cyber risk score corresponding to the at least one security log.

In accordance with another aspect of this disclosure, there is provided a non-transitory computer readable medium having instructions stored thereon executable by at least one processor to implement any of the methods described herein.

In accordance with another aspect of this disclosure, there is provided a system for monitoring a plurality of vehicles. Each vehicle includes at least one electronic control unit (ECU). Each ECU is operable to monitor at least one vehicular subsystem of the corresponding vehicle. The system includes: at least one processor in communication with the plurality of vehicles. The at least one processor is operable to: determine, based on cyber risk data corresponding to a plurality of ECU models, a cyber risk score for each ECU model, the cyber risk score indicating a probability of a cybersecurity threat for the ECU model; receive, from each of the vehicles, one or more security logs, each security log indicating one or more timestamped events recorded by an ECU of the corresponding vehicle; map, for each security log, i.) the ECU model of the ECU that recorded the security log, and ii.) the cyber risk score of the ECU model corresponding to the security log; detect a cybersecurity threat in at least some of the vehicles based on i.) at least one event in at least one security log, and ii.) at least one cyber risk score corresponding to the at least one security log; and in response to detecting the cybersecurity threat, transmit an alert indicating at least one vehicle corresponding to the at least one security log.

In some embodiments, the alert may further indicate at least one ECU model corresponding to the at least one security log.

In some embodiments, the cyber risk data may be received from one or more external data sources.

In some embodiments, the cyber risk data may indicate, for each ECU model, at least one cybersecurity control status of i.) the ECU model, and ii.) a manufacturer of the ECU model.

In some embodiments, the cyber risk data may indicate, for each ECU model, known vulnerabilities and breaches associated with the ECU model.

In some embodiments, the at least one processor may be operable to: for each security log, append a vehicle identifier to the security log, the vehicle identifier identifying the vehicle from which the security log was received. The alert may indicate the at least one vehicle corresponding to the at least one security log based on the corresponding vehicle identifier.

In some embodiments, the cybersecurity threat may be detected further based on the vehicle identifier of the at least one security log.

In some embodiments, the plurality of vehicles may include one or more vehicle fleets, and the at least one processor may be operable to: for each security log, append a fleet identifier to the security log, the fleet identifier identifying the vehicle fleet of the vehicle from which the security log was received. The alert may further indicate the vehicle fleet corresponding to the at least one security log based on the corresponding fleet identifier.

In some embodiments, the cybersecurity threat may be detected further based on the fleet identifier of the at least one security log.

In some embodiments, the at least one processor may be operable to: reformat at least some of the security logs so that each security log has the same format.

In some embodiments, the cybersecurity threat is detected in response to determining that at least one event in at least one security log meets a security log condition that is determined based on the at least one cyber risk score corresponding to the at least one security log.

BRIEF DESCRIPTION OF THE DRAWINGS

Several embodiments will be described in detail with reference to the drawings, in which.

Figure 1:
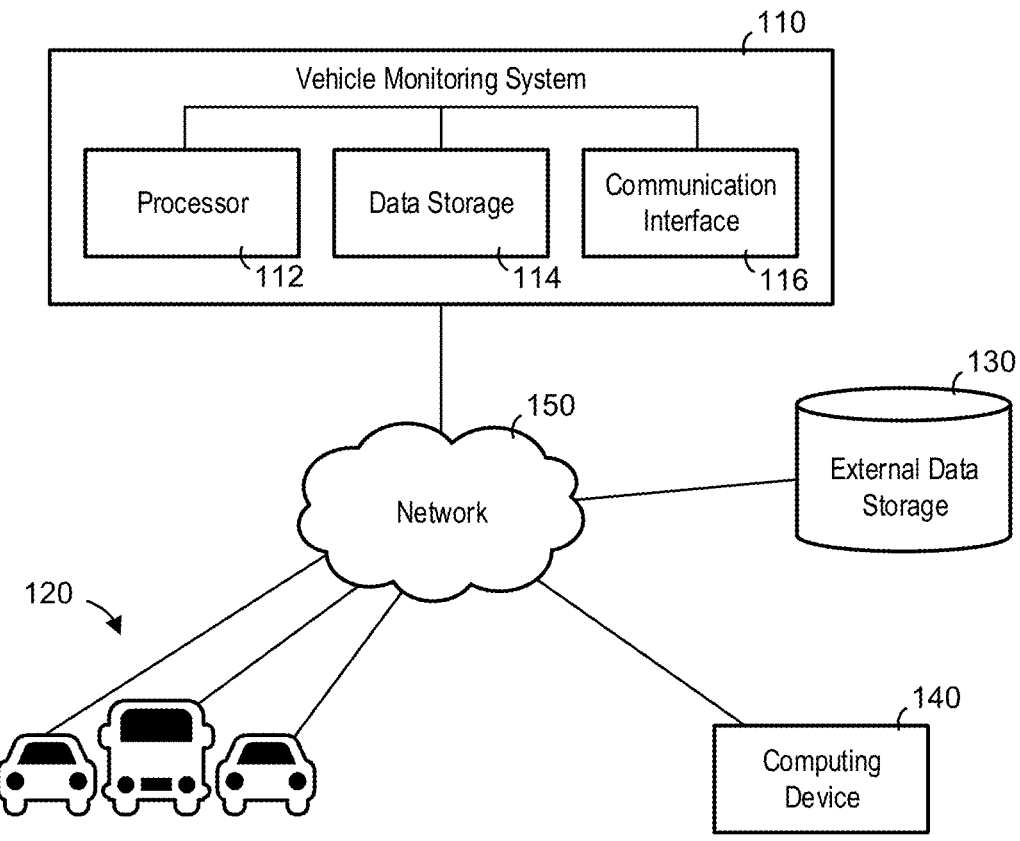
FIG. 1 is a block diagram of components interacting with an example vehicle monitoring system, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring now to FIG. 1, there is shown an example system 110 for monitoring a plurality of vehicles 120. The vehicle monitoring system 110 can be configured to detect cybersecurity threats in the vehicles 120. In particular, the vehicle monitoring system 110 can determine cyber risk scores, receive security logs from the vehicles 120, and detect cybersecurity threats based on the cyber risk scores and security logs. The cybersecurity threats may include any weakness in the cybersecurity of a vehicle 120 that could be exploited by a cyberattack, for example, to access to information, steal or damage software or hardware, or otherwise disrupt or misdirect services.

As shown, the vehicle monitoring system 110 is in communication with the plurality of vehicles 120 through a network 150. The vehicles 120 can be any machines for transporting people or cargo, including, but not limited to, motor vehicles (e.g., motorcycles, cars, trucks, or buses), railed vehicles (e.g., trains, or trams), watercraft (e.g., ships or boats), aircraft (e.g., airplanes or helicopters), or any combination thereof. In various embodiments, the vehicles 120 may be unmanned vehicles, including but not limited to, unmanned aerial vehicles (e.g., drones), unmanned ground vehicles (e.g., self-driving automobiles), or any combination thereof. Although only three vehicles 120 are shown in the illustrated example, it should be appreciated there can be any number of vehicles 120.

The vehicles 120 include a plurality of vehicular subsystems that provide various vehicular functionality. For example, for an automotive vehicle, the vehicular subsystems may include the engine, transmission, brakes, airbags, locks, etc. Each vehicle 120 generally also includes at least one electronic control unit (ECU). Each ECU is operable to monitor at least one vehicular subsystem of the corresponding vehicle 120. Specifically, each ECU can generate security logs that indicate timestamped events recorded by that ECU. The vehicle monitoring system 110 can receive one or more security logs from each of the vehicles 120.

Figure 6:
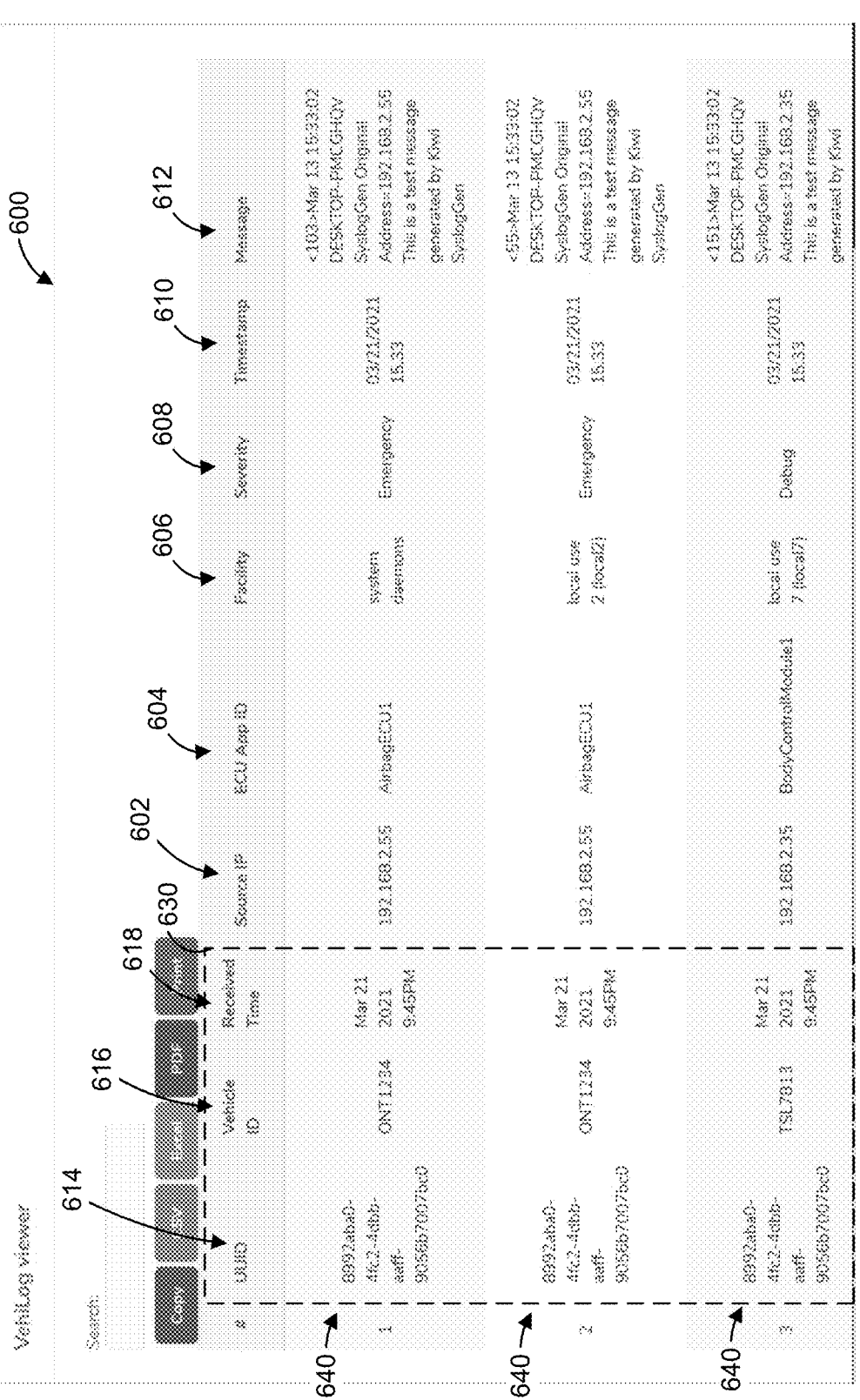
FIG. 6 is a screenshot of an example user interface for displaying security logs using a vehicle monitoring system.
Figure 16:
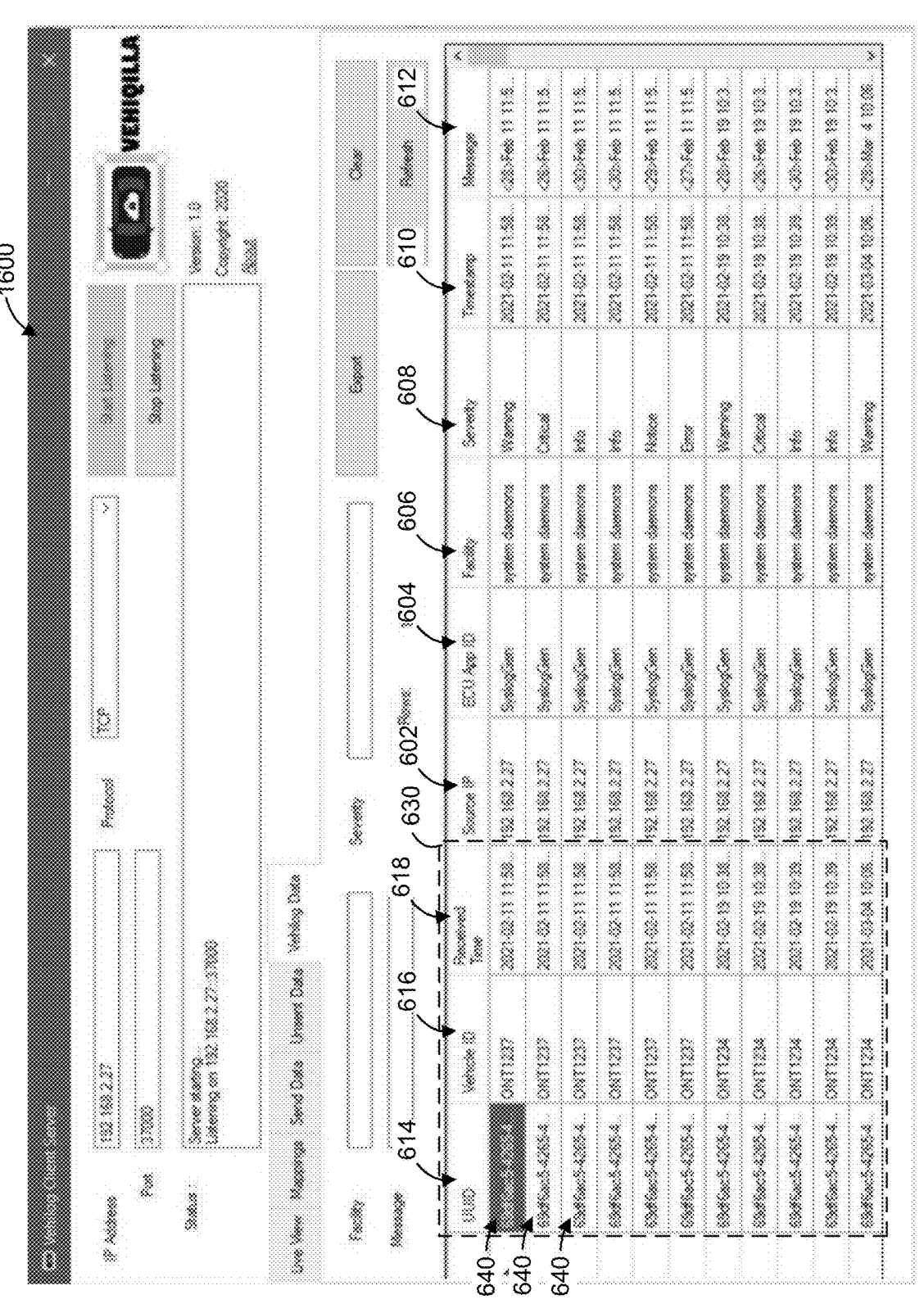
FIG. 16 is a screenshot of an example user interface for displaying security logs using a vehicle monitoring system.

Referring now to FIGS. 6 and 16, there is shown example security logs 600. As shown, the security logs 600 include a plurality of time stamped events 640. In the illustrated example, each event 640 includes a source IP 602 (i.e., indicating the IP address of the ECU), an ECU app ID 604 (i.e., indicating an identifier/name for the ECU), a facility 606 (i.e., indicating the program/process of the ECU that logs the event), a severity level 608 (i.e., indicating the severity of the event), a timestamp 610 (i.e., indicating the date and time the event was logged), and a message text 612 (i.e., indicating a description of the logged event). Each of these fields may be processed by the vehicle monitoring system 110 to detect cybersecurity threats in the vehicles 120. In the illustrated example, additional data fields 630 have been appended to the security logs 600 by the vehicle monitoring system 110. It should be appreciated that the appended data 630 is not present in the original security logs generated by the ECUs and received by the vehicle monitoring system 110. The additional data 630 can be processed by the vehicle monitoring system 110 along with the original security log data to detect cybersecurity threats in the vehicles 120. Although the security log 600 is Syslog format in the illustrated example, it should be appreciated that the security logs can have various file formats, including, but not limited to, CAN bus, J1939, etc.

Referring back to FIG. 1, the vehicle monitoring system 110 can generally be implemented using various hardware or a combination of hardware and software. For example, the vehicle monitoring system 110 may be implemented using an electronic tablet device, a personal computer, workstation, server, portable computer, mobile device, personal digital assistant, laptop, smart phone, WAP phone, or any combination of these. In some embodiments, the vehicle monitoring system 110 may be implemented using two or more computers distributed over a wide geographic area and connected through a network. As shown, the vehicle monitoring system 110 can include a processor 112, a data storage 114, and a communication interface 116. Each of these components may be divided into additional components or combined into fewer components. In some embodiments, two or more of the components may be distributed over a wide geographic area and connected through a network.

The processor 112 can be implemented with any suitable processor, controller, digital signal processor, graphics processing unit, application specific integrated circuits (ASICs), and/or field programmable gate arrays (FPGAs) that can provide sufficient processing power for the configuration, purposes and requirements of the vehicle monitoring system 110. The processor 112 can include more than one processor with each processor being configured to perform different dedicated tasks. The processor 112 can execute various instructions stored in the data storage 114 to implement the various vehicle monitoring methods described herein. For example, the processor 112 may be configured to determine cyber risk scores, receive security logs from the vehicles 120, and detect cybersecurity threats based on the cyber risk scores and security logs.

The data storage 114 can include RAM, ROM, one or more hard drives, one or more flash drives or some other suitable data storage elements such as disk drives. The data storage 114 may be used to store an operating system that provides various basic operational processes for the processor 112. The data storage 114 may include one or more databases, such as a relational database (e.g., a SQL database), for example. The data storage 114 can store instructions that can be executed by the processor 112 to implement the various vehicle monitoring methods described herein. The data storage 114 can also store various data used or generated by the vehicle monitoring methods described herein, such as data associated with security logs, cyber risk scores, detected cybersecurity threats, etc. For example, the data storage 114 may store various data associated with specific ECU models, vehicles (or vehicle fleets) that the ECU models are installed within, suppliers for the ECU models, OEMs (original equipment manufacturers) for the vehicles that that the ECU models are installed within, cyber risks associated with the ECU models, etc.

It should be understood that an ECU model refers to a particular design, version, or implementation of an ECU. In some cases, two ECUs having the same hardware, but different software or firmware, may be identified as two different ECU models. It should be understood that an ECU supplier refers to the manufacturer of a particular ECU model.

Figure 7:
FIG. 7 is a screenshot of an example user interface for displaying ECU data using a vehicle monitoring system.
Figure 8:
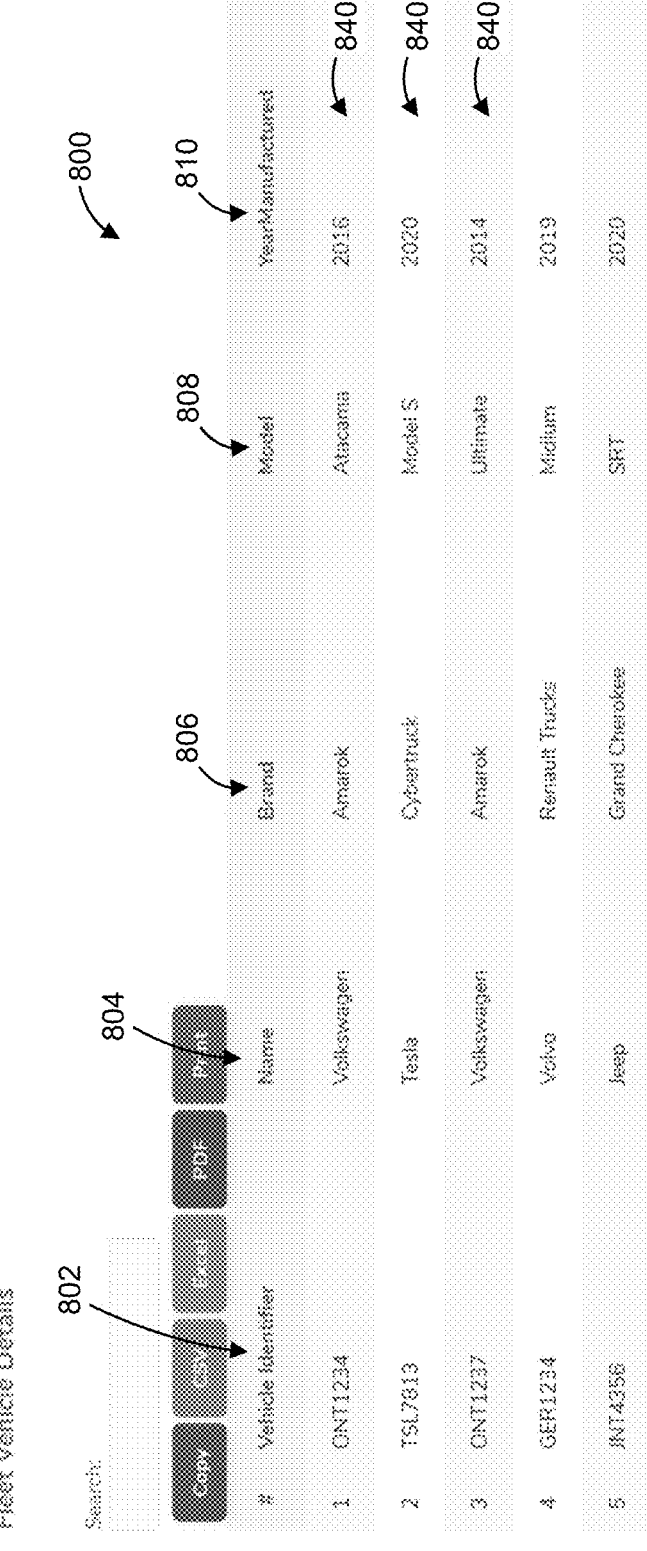
FIG. 8 is a screenshot of an example user interface for displaying vehicle fleet data using a vehicle monitoring system.

In some embodiments, the data storage 114 can include a database of ECU models and vehicles (or fleets of vehicles). The databases can be used by the vehicle monitoring system 110 to help identify vehicles and/or vehicle fleets that are at risk when cybersecurity attacks and/or vulnerabilities are detected for specific ECU models, suppliers, and/or OEMs. For example, referring to FIG. 7, there is shown example ECU model data 700 that can be stored by the data storage 114. As shown, the stored data can include for each ECU model 740, a name 702, a category 704, a supplier 706, a number of breaches 708, a number of vulnerabilities 710, a description 712, a date created 714 and cyber risk scores 714. Similarly, referring to FIG. 8, there is shown example vehicle data 800 that can be stored by the data storage 114. As shown, the stored data can include, for each vehicle 840 in a particular vehicle fleet, a vehicle identifier 802, a name 804, a brand 806, a model 808, and a year manufactured 810. The vehicle data 800 can be associated with the ECU data 700 such that each vehicle can be mapped to one or more ECU models or each ECU model can be mapped to one or more vehicles. For example, the vehicle data 800 may include data linking each vehicle 840 to one or more ECU models 740. Additionally, or alternatively, the ECU model data 700 may include data linking each ECU model 740 to one or more vehicles.

Referring back to FIG. 1, the communication interface 116 can include any interface that enables the vehicle monitoring system 110 to communicate with other devices and systems. The communication interface 116 can include at least one of a serial port, a parallel port or a USB port, in some embodiments. The communication interface 116 may also include an interface to a component via one or more of a Bluetooth, WIFI, Internet, Local Area Network (LAN), Ethernet, Firewire, modem, fiber, or digital subscriber line connection. Various combinations of these elements may be incorporated within the communication interface 116. For example, the communication interface 116 may receive input from various input devices, such as a mouse, a keyboard, a touch screen, a thumbwheel, a track-pad, a track-ball, a card-reader, voice recognition software and the like depending on the requirements and implementation of the vehicle monitoring system 110.

As shown, the vehicle monitoring system 110 can be in communication with various components through the network 150, including, but not limited to, the vehicles 120, an external data storage 130, and a computing device 140. The network 150 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the vehicle monitoring system 110 and various components.

The external data storage 130 can store various data associated with the operation of the vehicle monitoring system 110, similar to the data storage 114. For example, various data associated with security logs, cyber risk scores, or detected cybersecurity threats may be stored on the external data storage 130 for retrieval by the vehicle monitoring system 110 or the computing device 140. In some embodiments, the external data storage 130 may store older, or less frequently used data as compared the data storage 114.

The computing device 140 may be any networked device operable to connect to the network 150. A networked device is a device capable of communicating with other devices through a network, such as the network 150. A network device may couple to the network through a wired or wireless connection. The computing device 140 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these. The computing device 140 may be operated by a user to access various services provided by the vehicle monitoring system 110. For example, the computing device 140 may be operated by a user to import ECU or vehicle data, generate and view reports, or configure and receive alerts from the vehicle monitoring system 110. Although only a single computing device 140 is shown in the illustrated example, it should be appreciated that there may be any number of computing devices 140.

Figure 2:
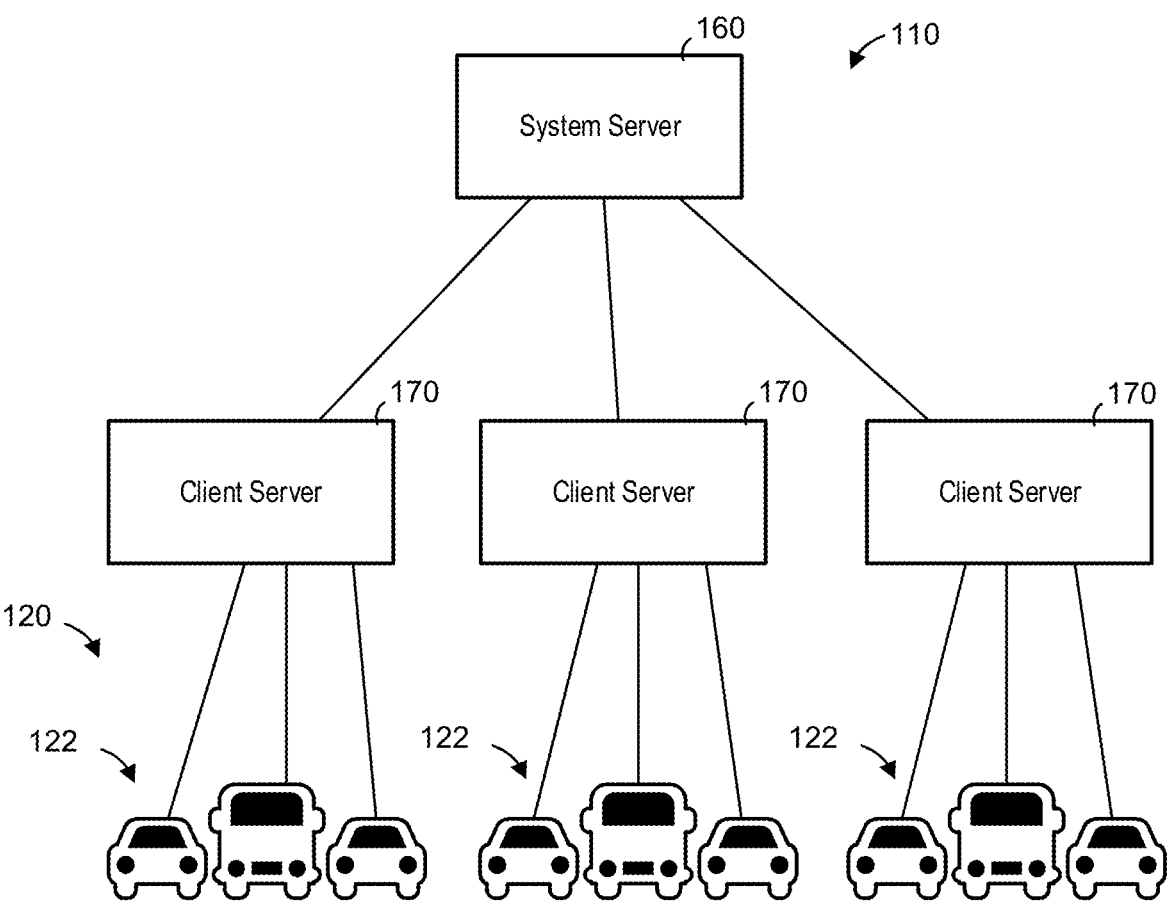
FIG. 2 is a block diagram of an example vehicle monitoring system, in accordance with an embodiment.

Referring now to FIG. 2, there is shown an example implementation of the vehicle monitoring system 110. As shown, the vehicle monitoring system 110 includes a system server 160 and a plurality of client servers 170. The system server 160 and the client servers 170 are computer servers that include at least a processor, data storage, and communication interface.

As shown, the system server 160 is in communication with each of the client servers 170, and the client servers 170 are in communication with the plurality of vehicles 120. One or more networks can connect the system server 160, the client servers 170, and the vehicles 120. As shown, the plurality of vehicle 120 includes a plurality of vehicle fleets 122. Each client server 170 is in communication with a fleet of vehicles 122. Although three client servers 170 and vehicle fleets 122 are shown in the illustrated example, it should be appreciated that there may be any number of client servers 170 and vehicle fleets 122.

Each client server 170 can receive various data, including, but not limited to security logs, from each vehicle in the corresponding fleet of vehicles 122. The system server 160 can then collect the received data from each of the client servers 170. In this manner, the system server 160 can collect data from each vehicle in each vehicle fleet 122. The system server 160 can then process the collected data in various ways to monitor the vehicles 120.

In various embodiments, the system server 160 and the client servers 170 may be distributed over a wide geographic area. For example, each client server 170 may be located at a local site associated the corresponding fleet of vehicles 122. The system server 160 can be located at a remote site that is remote from each of the local sites and the vehicle fleets 122. In this manner, each client server 170 can be proximally located to a corresponding vehicle fleet 122 to collect data in a faster and more efficient fashion.

In various embodiments, the client servers 170 may pre-process at least some of the data received from the vehicles 120. That is, the client servers 170 may perform initial processing on the vehicle data prior to processing by the system server 160. For example, the client servers 170 may reformat or augment at least some of the data received from the vehicles 120. Distributing the processing between the system server 160 and the client servers 170 can reduce the amount of processing required at the system server 160.

In some embodiments, the client servers 170 may reformat at least some of data received from the vehicles 120. For example, security logs may be received from the vehicles 120 in different formats, including, but not limited to Syslog, CAN bus, J1939, etc. The client servers 170 can reformat at least some of the received security logs so that each security log has the same format. For instance, the client servers 170 may format the security logs to conform to the Syslog format. In this manner, the security logs can be provided to the system server 160 in a consistent format that can be more easily processed.

In some embodiments, the client servers 170 may append additional information to at least some of the data received from the vehicles 120. For example, security logs received from the vehicles 120 may not identify the vehicle 120 from which the security log was received or the fleet 122 to which the vehicle 120 belongs. The client servers 170 can append a vehicle identifier and/or a fleet identifier to each security log. Each vehicle identifier can identify the vehicle 120 from which the security log was received. Each fleet identifier can identify the vehicle fleet 122 of the vehicle 120 from which the security log was received. The vehicle and fleet identifiers can be unique identifiers that uniquely identify a particular vehicle and fleet respectively. Each vehicle 120 can be assigned a unique vehicle identifier and each fleet 122 can be assigned a unique fleet identifier. In this manner, the system server 160 can identify the vehicle and fleet from which each security log was received.

Referring now to FIGS. 6 and 16, there is shown example processed security logs 600 which can be generated by a client server 170. As shown, the security log 600 includes a plurality of timestamped events 640, and each event 640 includes additional information 630 that was not originally present in the security logs 600 when initially generated by the ECUs. As shown, each event 620 additionally includes a fleet identifier 614, a vehicle identifier 616, and a received time 618 (i.e., the time the security log 600 was received by the vehicle monitoring system 110), that can be appended by a client server 170.

Figure 3:
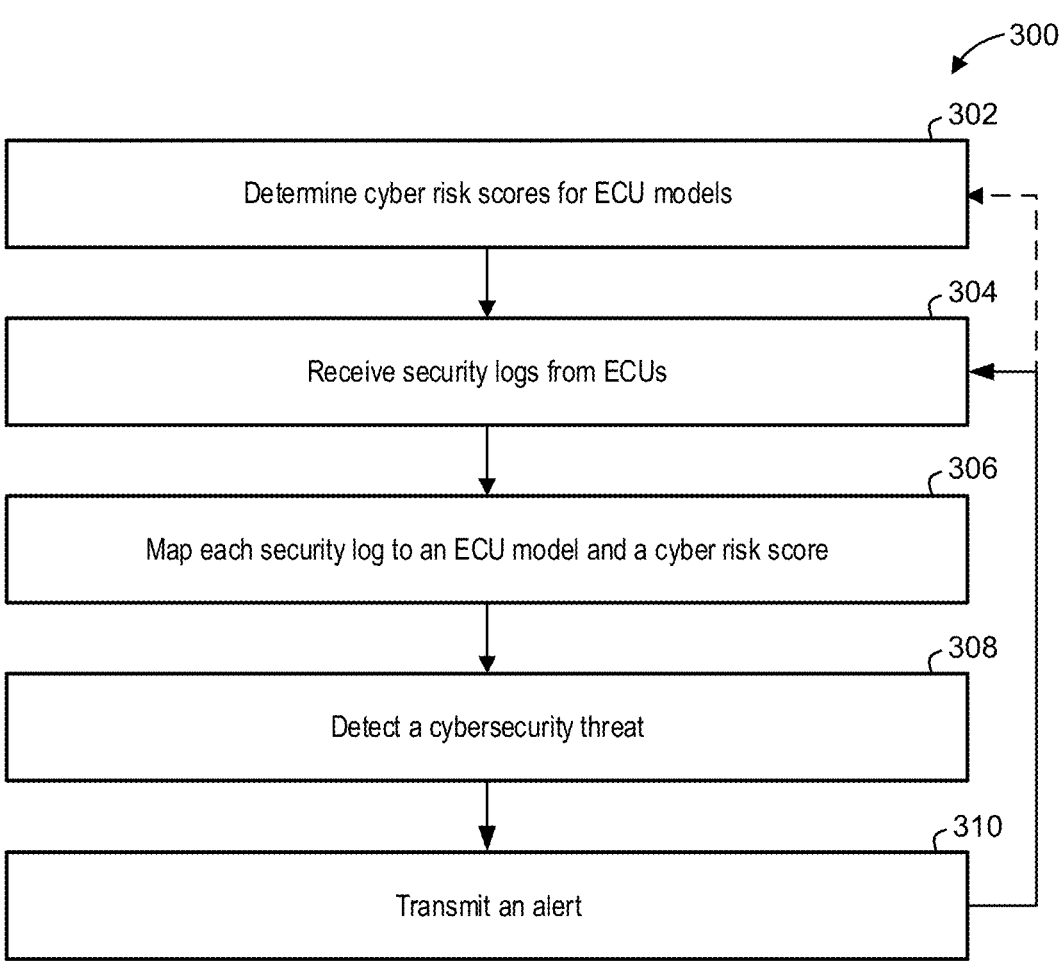
FIG. 3 is a flowchart of an example method for monitoring a plurality of vehicles, in accordance with an embodiment.

Referring now to FIG. 3, there is shown an example method 300 for monitoring a plurality of vehicles 120. The vehicle monitoring method 300 can be implemented using the vehicle monitoring system 110. For example, the vehicle monitoring method 300 can implemented by the processor 112 executing instructions stored on the data storage 114.

At 302, the processor 112 can determine a plurality of cyber risk scores for a plurality of ECU models. As described herein, each ECU model can refer to a particular design, version, or implementation of an ECU. Each cyber risk score can indicate the probability of a cybersecurity threat for the corresponding ECU model. The processor 112 can determine the cyber risk scores based on cyber risk data associated with the plurality of ECU models. The cyber risk data can be received from one or more external data sources. Alternatively, the cyber risk data can be retrieved internally from the vehicle monitoring system 110 (e.g., the data described with regard to FIGS. 7 and 8).

In general, the cyber risk data can include any data associated with the cybersecurity for the ECU models. For example, the cyber risk data may include various data associated with the cybersecurity control status of an ECU model and/or a manufacturer of an ECU model. For instance, the cyber risk data may include data associated with the various systems or processes implemented by an ECU model and/or an ECU manufacturer to monitor, mitigate, or otherwise respond to cyberattacks. Alternatively, or additionally, the cyber risk data may include data indicating known vulnerabilities and breaches associated with an ECU models and/or a manufacture of an ECU model. For example, the cyber risk data may include information corresponding to known cyberattacks on particular ECU models and/or ECU manufacturers, and known cybersecurity weaknesses in particular ECU models and/or ECU manufacturers that could be exploited by cyberattacks. The cyber risk data may also include the vehicles (or vehicle fleets) that a particular ECU model is installed, the OEMs of the vehicles, and/or suppliers of the ECU model or the vehicles.

It should be appreciated that a manufacturer of an ECU model may refer to an OEM (original equipment manufacturer), a supplier, an assembler, and/or any party involved in the manufacture, design, and/or distribution for a particular ECU model.

Figure 4:
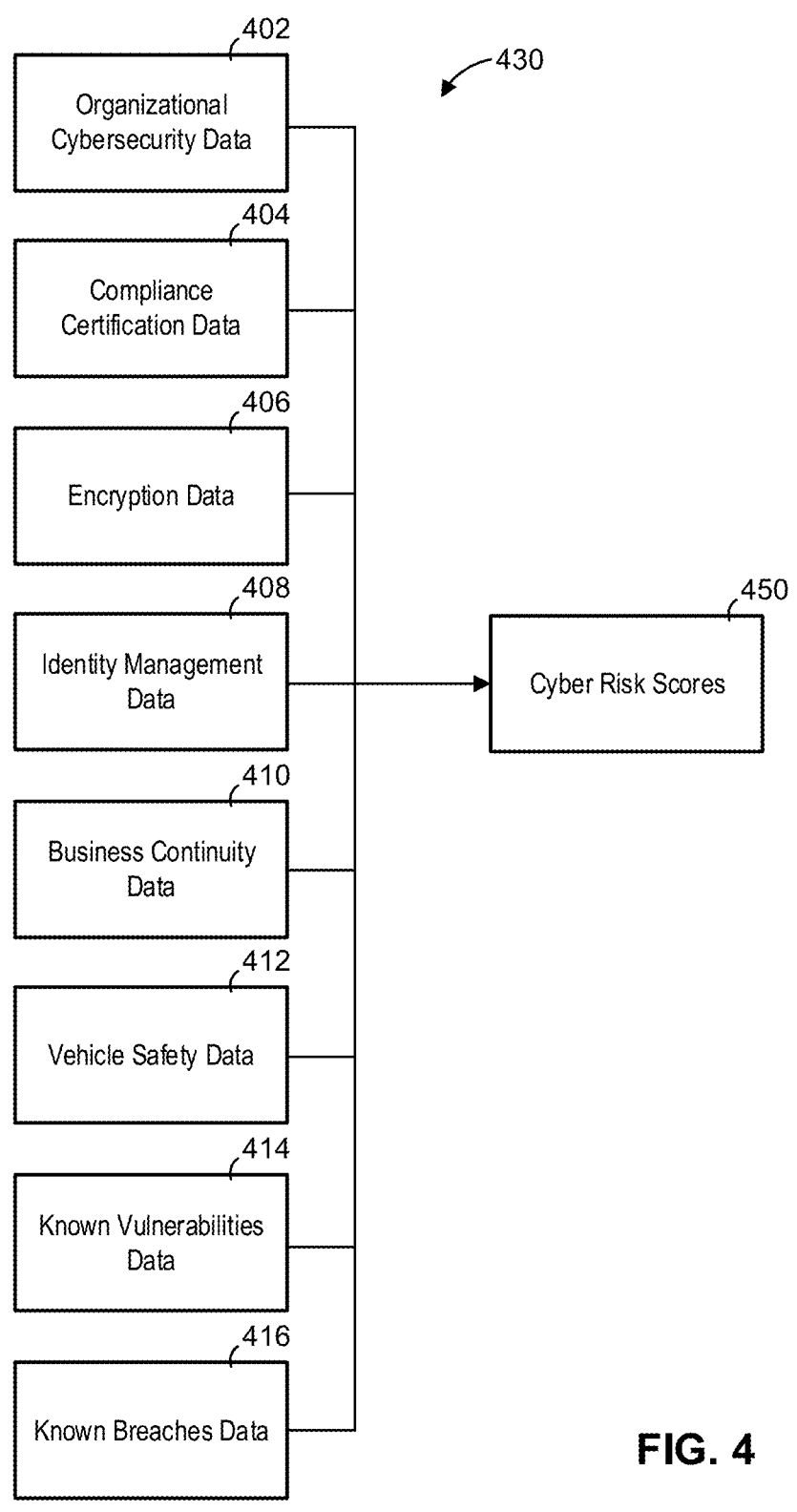
FIG. 4 is a schematic diagram of an example method for determining cyber risk scores, in accordance with an embodiment.

Referring to FIG. 4, there is shown an example of cyber risk data 430 that can be used by the processor 112 to determine cyber risk scores 450. As shown, the cyber risk data 430 can include various datasets, including organizational cybersecurity data 402, compliance certification data 404, encryption data 406, identity management data 408, business continuity data 410, vehicle safety data 412, known vulnerabilities data 414, and known breaches data 416. The processor 112 may use any of these datasets or additional datasets to determine the cyber risk scores 450.

The organizational cybersecurity data 402 can include various information related to the organizational security policies of the manufacturers of the ECU models. For example, the organizational cybersecurity data 402 can include information indicating the ECU manufacturers' security systems, policies, procedures, etc.

The compliance certification data 404 can include various information regarding compliance with security standards, certifications, frameworks, or regulations by the ECU models or ECU manufacturers. For example, the compliance certification data 404 may indicate whether the ECU models or ECU manufacturers are compliant with a particular standard, such as ISO 21434 (Cybersecurity engineering for road vehicles), ISO/IEC 27001 (Information security management), etc.

The encryption data 406 can include various information associated with the encryption used by ECU models or manufacturers of the ECU models. For example, the encryption data 406 may include information related to the type of encryption used by the ECU models or ECU manufacturers.

The identity management data 408 can include various information associated with the identity authentication used by the ECU models or manufacturers of the ECU models. For example, the identity management data 408 may include information indicating the identity or password management policies of the ECU manufacturers, authentication protocols used by the ECU models, etc.

The business continuity data 410 can include various information associated with business continuity controls of the manufacturers of the ECU models. For example, the business continuity data 410 may include information related to ECU manufacturer disaster recovery plans, customer support systems, etc.

The vehicle safety data 412 can include various information associated with safety of the ECU models or manufacturers of the ECU models. For example, the vehicle safety data 412 may include information indicating the hazard or safety risk of the ECU models in the event of malfunction. The vehicle safety data 412 may also include information indicating the controls and procedures of the ECU manufacturers to mitigate safety risk.

The known vulnerabilities data 414 can include various information associated with known cybersecurity weakness in the ECU models or manufacturers of the ECU models that could be exploited by a cyberattack. For example, the known vulnerabilities data 414 may include information indicating detected vulnerabilities from penetration testing. The known vulnerabilities data 414 may also include information indicating the response strategy of an ECU manufacturer in the event of a vulnerability being breached.

The known breaches data 416 can include various information associated with known successful cyberattacks on ECU models or manufacturers of the ECU models. For example, the known breaches data 416 may include information indicating when the successful cyberattacks occurred, which vulnerability were exploited by the cyberattacks, etc. The known breaches data 416 may also include information indicating the response strategy of an ECU manufacturer in the event of a breach.

The processor 112 can determine the cyber risk scores based on the cyber risk data 430 in various ways. In some embodiments, predetermined point values can be assigned to various aspects of cyber risk. For example, for compliance certification, a predetermined number of points can be assigned to whether an ECU model and/or an ECU manufacturer complies particular standard, such as ISO 21434 or ISO/IEC 27001. Various point values can be assigned to various aspects of cyber risk. The processor 112 can determine the number of points for each aspect of cyber risk for each ECU model to determine the cyber risk scores.

In some embodiments, the cyber risk scores can be determined based on one or more artificial intelligence or machine-learned models trained to predict the cyber risk scores based on the cyber risk data 250. Various types of training methods may be used to produce the predictive models, such as support vector machines, linear regression, logistic regression, naïve Bayes, linear discriminant analysis, decision trees, k-nearest neighbor algorithms, neural networks, similarity learning, and the like.

Figure 5:
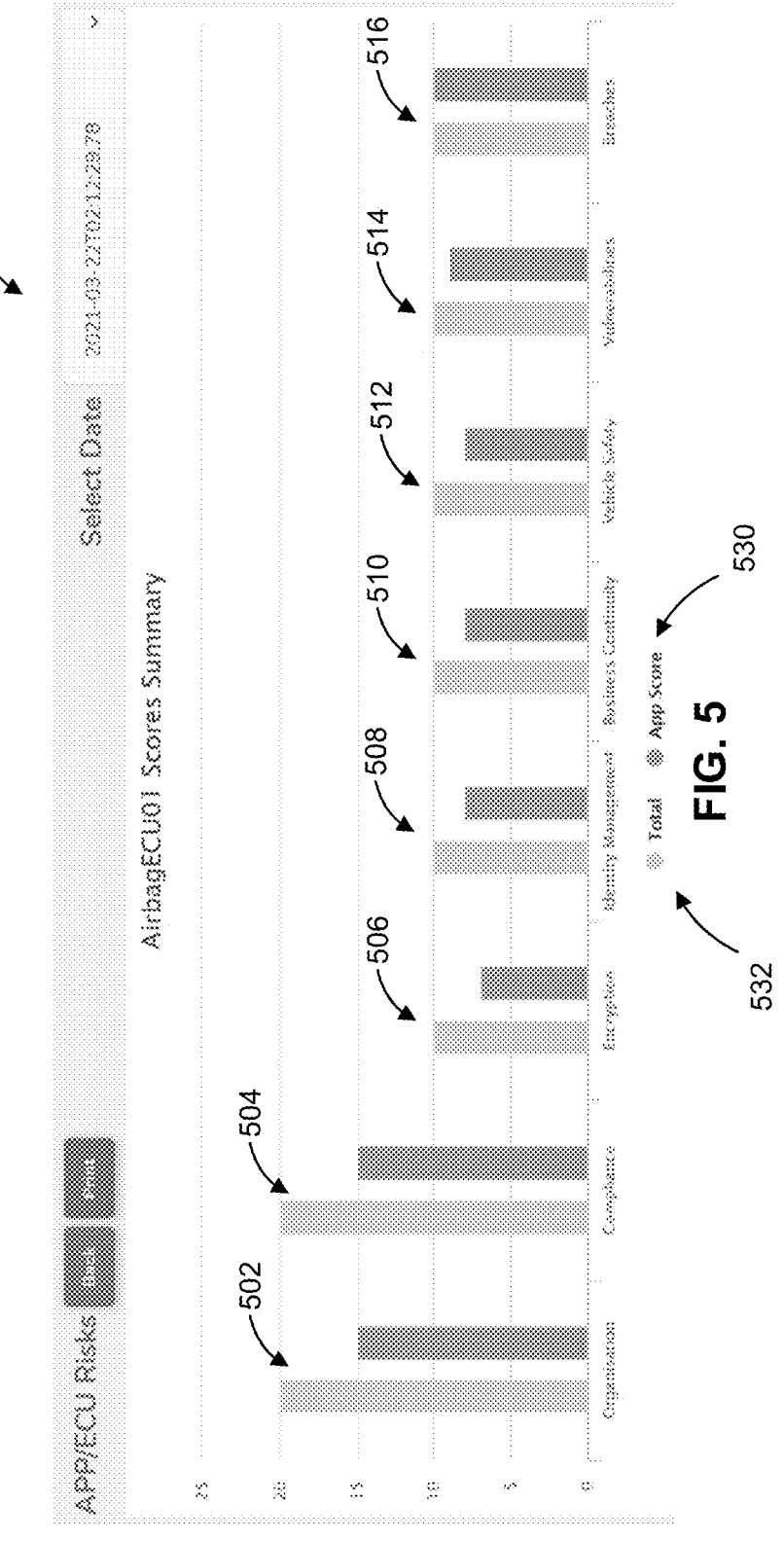
FIG. 5 is a screenshot an example user interface for displaying cyber risk scores using a vehicle monitoring system.

Referring now to FIG. 5, there is shown an example of a cyber risk score 500 for an ECU model. In the illustrated example, the cyber risk score 500 includes a plurality of subscores. Specifically the cyber risk score 500 includes an organizational subscore 502, a compliance subscore 504, an encryption subscore 506, an identity management subscore 508, business continuity subscore 510, a vehicle safety subscore 512, a vulnerabilities subscore 514, and a breaches subscore 516. Each subscore can correspond to the risk of a cybersecurity threat for the ECU model for a particular aspect of the ECU model. In some embodiments, the cyber risk score 500 may include an overall score that reflects the overall risk of a cybersecurity threat for the ECU model.

Each subscore can correspond to a particular aspect of the cyber risk data and be determined from that data subset. For example, the organizational subscore 502 can correspond to the organizational cybersecurity data 402, the encryption subscore 506 can correspond to the encryption data 406, the identity management subscore 508 can correspond to the identity management data 408, etc.

In the illustrated example, the cyber risk score 500 include the cyber risk score for a particular ECU 530, as well as the average cyber risk score 532 for a particular ECU supplier.

Referring back to FIG. 3, at 304, the processor 112 can receive one or more security logs from each of the vehicles 120. As described herein, each security log can indicate one or more timestamped events recorded by an ECU of the corresponding vehicle 120. The security logs can be received in a variety of formats, including, but not limited to, Syslog, CAN bus, J1939, etc.

In some embodiments, the processor 112 can reformat at least some of the security logs so that each security log has the same format. Additionally, or alternatively, the processor 112 can append a vehicle identifier and/or a fleet identifier to each security log that identify the corresponding vehicle or vehicle fleet respectively.

At 306, the processor 112 can map the security logs to ECU models and cyber risk scores. Specifically, the processor 112 can map each security log to i.) the ECU model of the ECU that recorded the security log, and ii.) the cyber risk score of the ECU model corresponding to the security log.

In various embodiments, the processor 112 can map the security logs to the ECU models based on one or more fields in security log. For example, in the example security log 600 shown in FIG. 6, the ECU model can be determined based on the message text 618. The processor 112 may also cross-reference various data stored in the data storage 114 to determine the ECU model of the ECU that recorded the security log. For example, the processor 112 may determine the ECU model based partly on the database of ECU models stored in the data storage 114. The processor 112 can then map the ECU model to a cyber risk score determined at 304.

At 308 the processor 112 can detect a cybersecurity threat in at least some of the vehicles 120. The processor 112 can detect the cybersecurity threat based on i.) at least one event in at least one security log, and ii.) at least one cyber risk score corresponding to the at least one security log.

In some embodiments, the cybersecurity threat can be detected based at least partly on severity level in the at least one security log. For example, a high severity level may indicate a potential cybersecurity threat. In some embodiments, the cybersecurity threat can be detected based at least partly on message text in the at least one security log. For example, message text indicating a modified security setting may indicate a potential cybersecurity threat. In some embodiments, the cybersecurity threat can be detected based at least partly on a vehicle identifier in the at least one security log. In some embodiments, the cybersecurity threat can be detected based at least partly on a fleet identifier in the at least one security log.

In some embodiments, the cybersecurity threat can be detected based solely on the at least one security log. In other embodiments, the cybersecurity threat can be detected based solely on the at least one cyber risk score. In other embodiments, the cybersecurity threat can be detected based on both the at least one security log and the at least one cyber risk score. This may allow the vehicle monitoring system 110 to detect cybersecurity threats that may otherwise be undetected using only security logs or only cyber risk scores.

For example, a security log from a particular ECU may indicate a low severity level event, such as a warning. Hence, if only that security log was considered, the ECU may not be considered to be at risk. However, a cyber risk score may indicate that the ECU model of the ECU has as high risk of a cybersecurity threat. Hence, the vehicle monitoring system 110 may detect a cybersecurity threat when the severity level is anything above notice. As another example, a cyber risk score for a particular ECU model may indicate a very low risk of a potential cybersecurity threat. Hence, if only the cyber risk score was considered, ECUs of that model may not be considered to be at risk. However, security logs generated from the ECUs may indicate a high severity level, such as emergency. Hence, the vehicle monitoring system 110 may detect a cybersecurity threat when the severity level is sufficiently high, even when the cyber risk score is low.

In general, the vehicle monitoring system 110 can holistically process security log events and cyber risk scores in various ways to detect cybersecurity threats. In some embodiments, the vehicle monitoring system 110 may use various machine-learned or artificial intelligence models to predict the cybersecurity threats based on the security logs based on the security logs and cyber risk scores.

In some embodiments, the processor 112 can detect the cybersecurity threat when the at least one event in at least one security log meets a predetermined security log condition. For example, the processor 112 may detect the cybersecurity threat when a severity level exceeds a predetermined level or message text contains a predetermined text string. In some embodiments, the processor 112 can detect the cybersecurity threat when the at least one cyber risk score corresponding to the at least one security log meets a predetermined cyber risk score condition. For example, the processor 112 may detect the cybersecurity threat when the at least one cyber risk score corresponding to the at least one security log exceeds a predetermined cyber risk score threshold.

In some embodiments, the processor 112 may detect the cybersecurity threat in response to determining that at least one event in at least one security log meets a security log condition that is determined based on the at least one cyber risk score corresponding to the at least one security log. For example, the security log condition may be a severity level above which a cybersecurity threat is detected. The security log condition can depend on the cyber risk score. For example, a low cyber risk score may result in a high severity level threshold. Since the probability of a cybersecurity threat is low, only high severity level events will be detected as cybersecurity threats. As another example, a high cyber risk score may result in a low severity level threshold. Since the probability of a cybersecurity threat is high, even low severity level events will be detected as cybersecurity threats.

In various embodiments, the processor 112 may detect the cybersecurity threat based on at least one set of predetermined conditions, each set of predetermined conditions including one predetermined security log condition and one predetermined cyber risk score condition. The processor 112 can detect the cybersecurity threat when the at least one event in at least one security log satisfies a predetermined security log condition and the at least one cyber risk score corresponding to the at least one security log satisfies a predetermined cyber risk score condition belonging to the same set of predetermined conditions as the predetermined security log condition. For example, one set of predetermined conditions may include a low cyber risk score threshold and a high predetermined security log condition; another set of predetermined conditions may include a high cybersecurity risk score threshold and a low predetermined security log condition; a further set of predetermined conditions may include a medium cybersecurity risk score threshold and a medium predetermined security log condition; etc.

At 310, the processor 112 can transmit an alert. The processor 112 can transmit the alert in response to the detection of a cybersecurity threat. The alert can be transmitted to various systems or devices. In some embodiments, the alert can be transmitted from the system server 160 to one or more client servers 170. In some embodiments, the alert can be transmitted to one or more external fleet management systems. In some embodiments, the alert can be transmitted to an external device associated with a fleet manager and/or vehicle operator. In other embodiments, the alert can be transmitted to one or more of the vehicles 120.

The alert can indicate various information associated with the detected cybersecurity threat. In some embodiments, the alert can indicate at least one vehicle 120 corresponding to the at least one security log, for example, based on one or more corresponding vehicle identifiers. In some embodiments, the alert can indicate at least one ECU model corresponding to the at least one security log. In some embodiments, the alert can indicate at least one vehicle fleet corresponding to the at least one security log, for example based on one or more corresponding fleet identifiers.

In some embodiments, the alert can automatically trigger various systems or devices to perform various actions to mitigate or otherwise respond to the detected cybersecurity threat. For example, the alert may automatically trigger a fleet management system to display a warning message to a fleet manager. As another example, the alert may automatically trigger a vehicle 120 to display a warning message to a vehicle operator.

Figure 9:
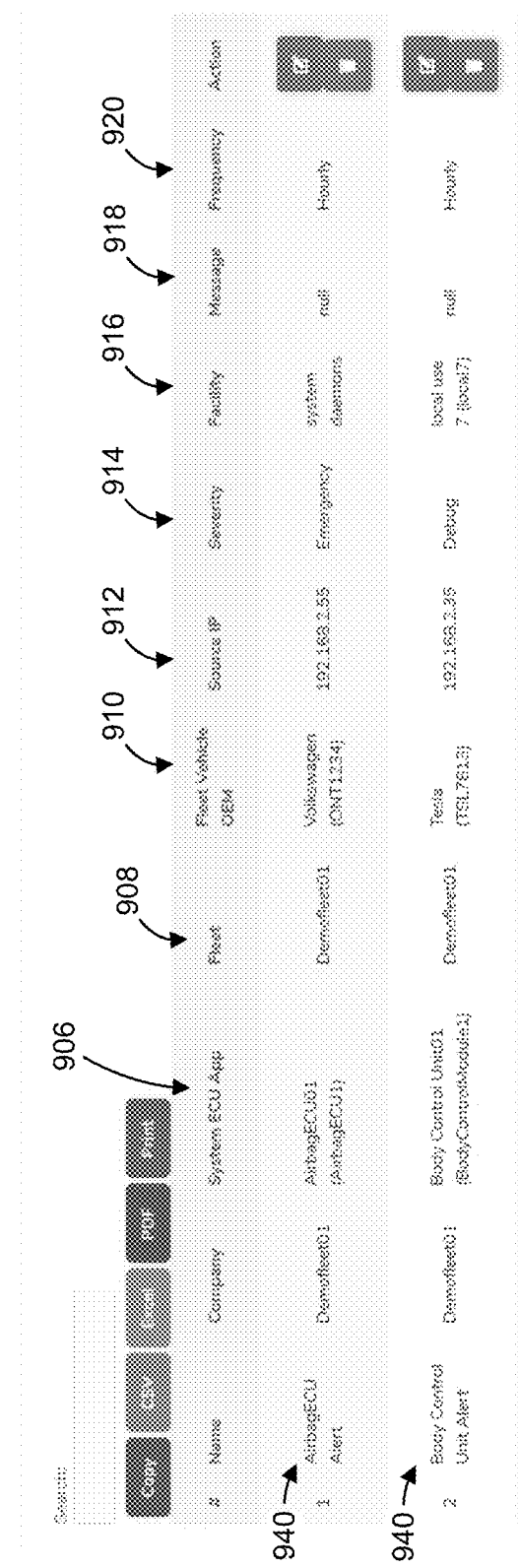
FIG. 9 is a screenshot of an example user interface for configuring alerts using a vehicle monitoring system.

In various embodiments, the processor 112 may transmit other alerts in response to other predetermined criteria. For example, referring to FIG. 9, there is shown an example user interface 900 that can be operated by a user to configure various alerts. Particularly, the user interface 900 can be operated by user to set various triggering criteria for an alert. In the illustrated example, an alert 940 can triggered in response the detection of an ECU model 906, a vehicle fleet 908, a vehicle 910, a source IP 912, a severity level 914, a facility 916, and/or a message text. In general, alerts can be triggered by the vehicle monitoring system 110 in response to any field in a security logs, including, but not limited to, vehicle identifier, ECU model, severity level, date or time, facility, source IP, message text, etc. The trigger conditions can be tested in real time, or intermittently. In the illustrated example, the trigger conditions are tested at an hourly frequency 918.

In some embodiments, the processor 112 may not transmit alerts. For example, in some embodiments, the processor 112 may generate reports containing various data associated with the cybersecurity of the vehicles 120. The reports may be generated automatically (e.g., in response to detected cybersecurity threats and/or at a predetermined frequency) and/or in response to user requests. If the reports are reviewed by users regularly, there may not be a need for alerts to be transmitted. In other embodiments, the processor 112 may generate both alerts and reports. Reference will now be made to FIGS. 10-15 and 17-19 which show examples of reports that can be generated by the vehicle monitoring system 110.

Figure 10:
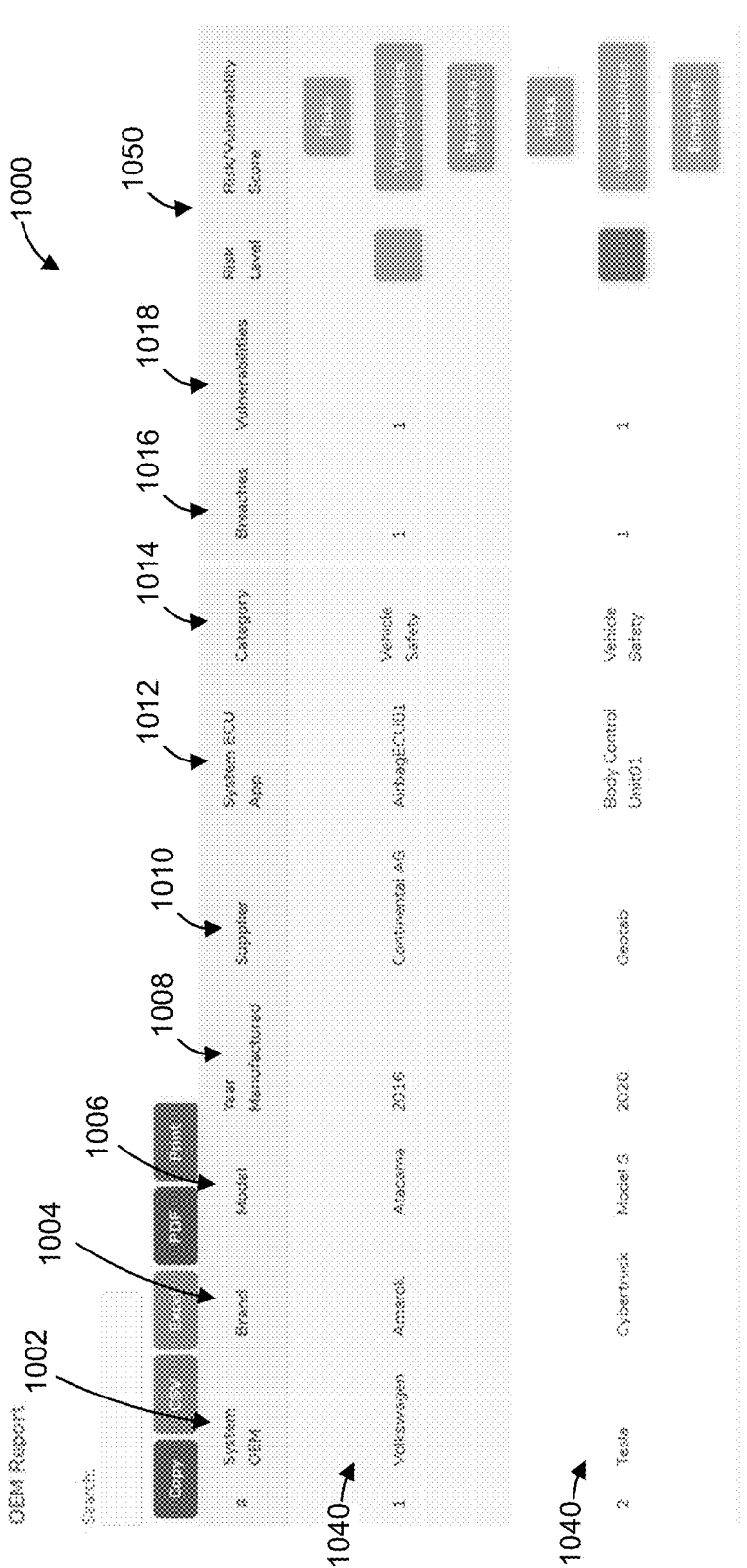
FIG. 10 is a screenshot of an example user interface for displaying for a report for one or more OEMs using a vehicle monitoring system.

FIG. 10 shows an example OEM report 1000 that contains data associated one or more OEMs. As shown, the report 1000 can include data corresponding to each vehicle model manufactured by the one or more OEMs and the ECU models installed in the vehicle models. In the illustrated example, the report data includes the OEM 1002, vehicle brand 1004, vehicle model 1006, year manufactured 1008, supplier 1010, ECU model 1012, ECU category 1014, number of breaches 1016, number of vulnerabilities 1018, and cyber risk score 1050. As shown, the cyber risk score is presented as an overall risk level and a plurality of subscores for risks, vulnerabilities, and breaches. A user can select any of the subscores to obtain additional information on the subscores.

Figure 11:
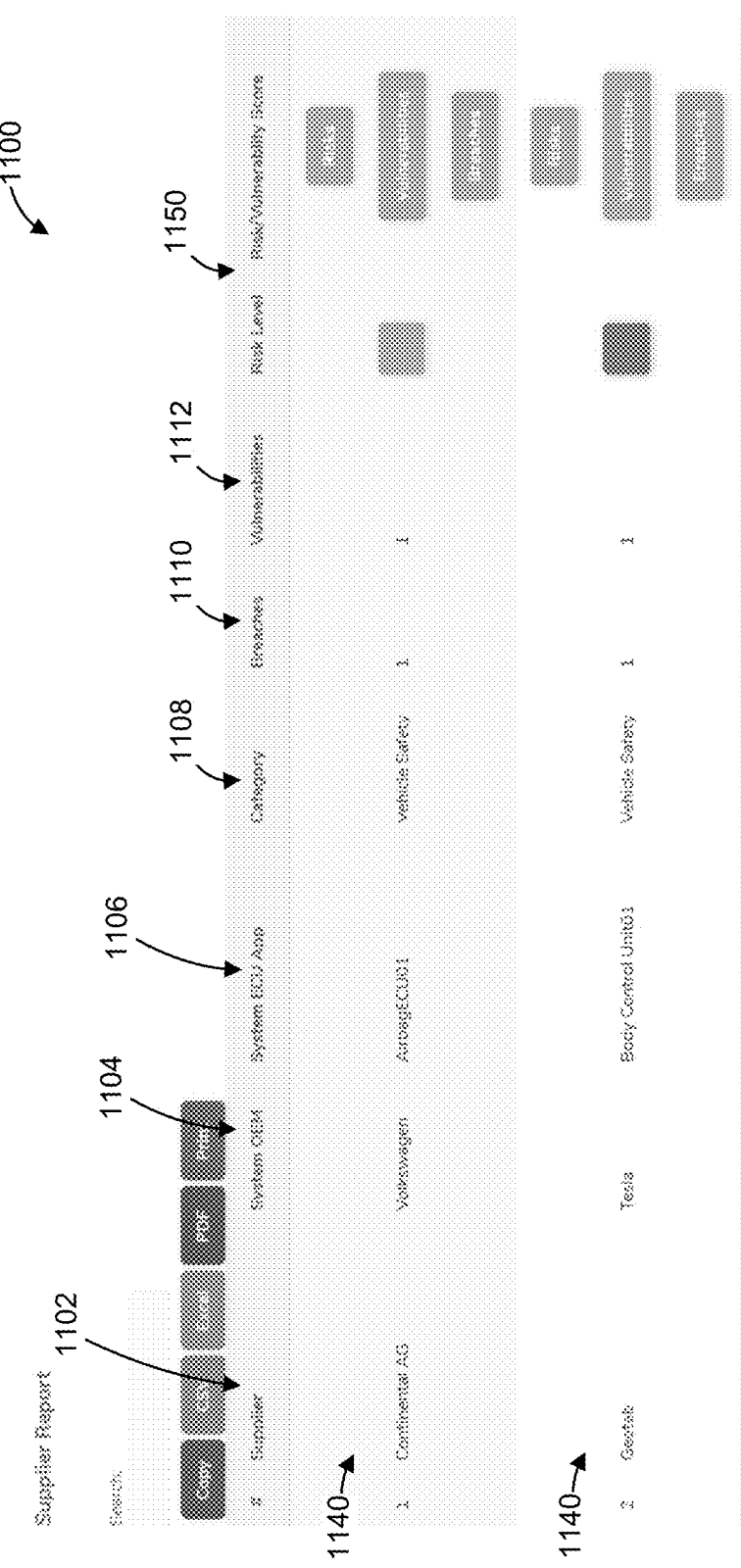
FIG. 11 is a screenshot of an example user interface for displaying a report for one or more suppliers using a vehicle monitoring system.

FIG. 11 shows an example supplier report 1100 that contains data associated with one or more suppliers. As shown, the supplier report 1100 can include data for each ECU model manufactured by the one or more suppliers and the vehicle models in which the ECU models are installed. In the illustrated example, the report data includes the supplier 1102, OEM 1104, ECU model 1106, ECU category 1108, number of breaches 1110, number vulnerabilities 1112, and cyber risk score 1150. Again, the cyber risk score is presented as an overall risk level and a plurality of subscores for risks, vulnerabilities, and breaches. A user can select any of the subscores to obtain additional information on the subscores.

Figure 12:
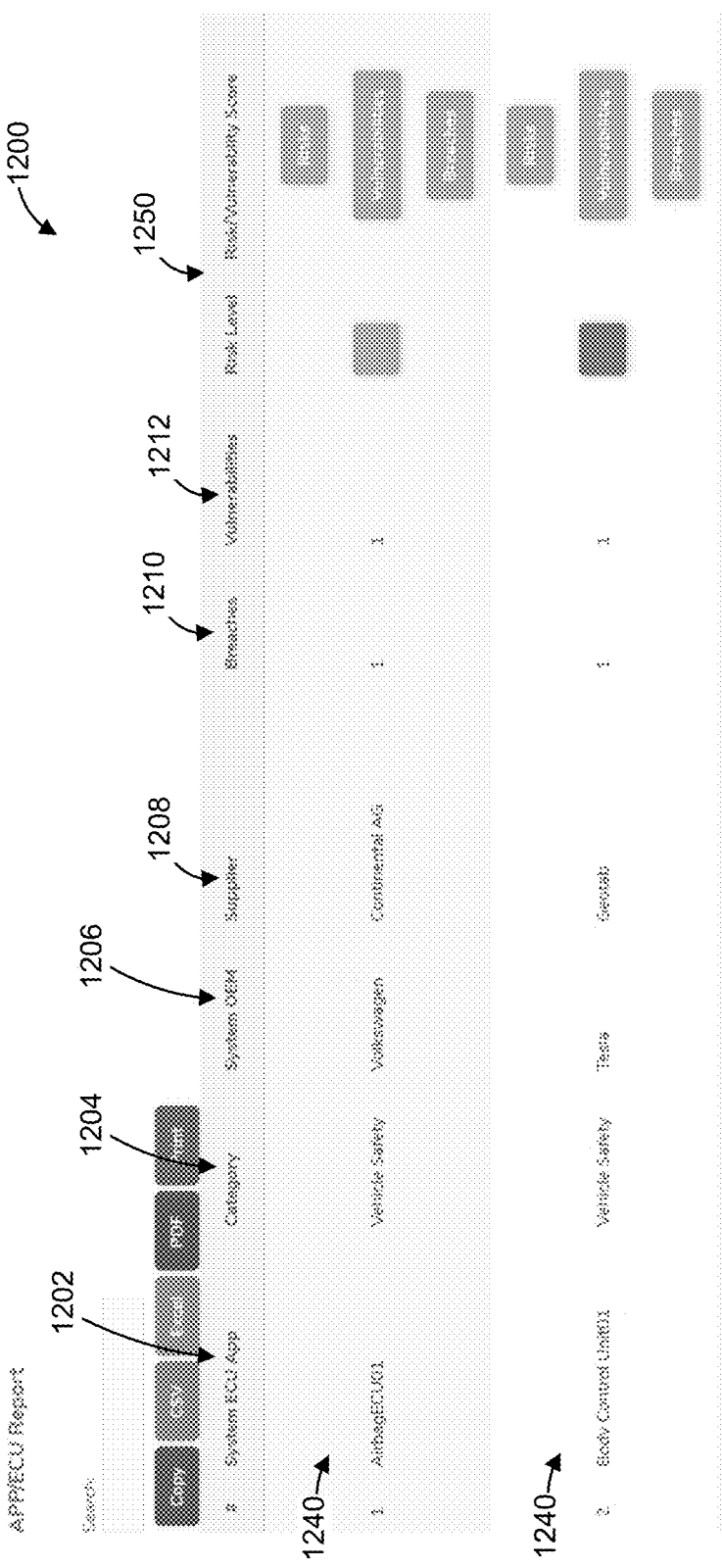
FIG. 12 is a screenshot of an example user interface for displaying a report for one or more ECUs using a vehicle monitoring system.

FIG. 12 shows an example ECU report 1200 that contains data associated with one or more ECU models. As shown, the ECU report 1200 can include various data associated the one or more ECU models, such as the vehicle models in which the ECU model is installed. Specifically, in the illustrated example, the report data includes the ECU model 1202, ECU category 1204, OEM 1206, supplier 1208, number of breaches 1210, number of vulnerabilities 1212, and cyber risk score 1220. Again, the cyber risk score is presented as an overall risk level and a plurality of subscores for risks, vulnerabilities, and breaches. A user can select any of the subscores to obtain additional information on the subscores.

Figure 13:
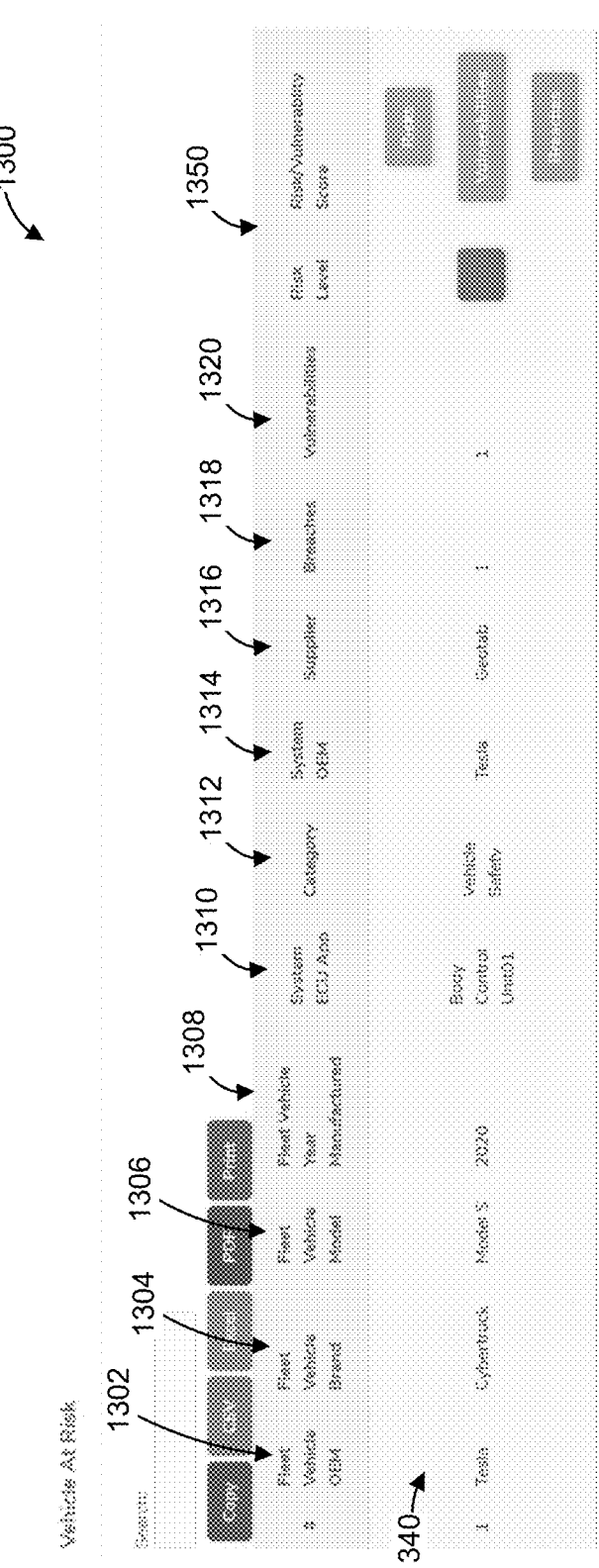
FIG. 13 is a screenshot of an example user interface for displaying a report for one or more at risk vehicles using a vehicle monitoring system.

FIG. 13 shows an example vehicles at risk report 1300 that contains data associated with one or more vehicles associated with detected cybersecurity threats. As shown, the vehicles at risk report 1300 can include various data associated with the at risk vehicles, including the ECU models installed in the at risk vehicles. Specifically, in the illustrated example, the report data includes the vehicle OEM 1302, vehicle brand 1304, vehicle model 1306, vehicle year manufactured 1308, ECU model 1310, ECU category 1312, OEM 1314, supplier 1316, number of breaches 1318, number vulnerabilities 1320, and cyber risk score 1350. Again, the cyber risk score is presented as an overall risk level and a plurality of subscores for risks, vulnerabilities, and breaches. A user can select any of the subscores to obtain additional information on the subscores.

Figure 14:
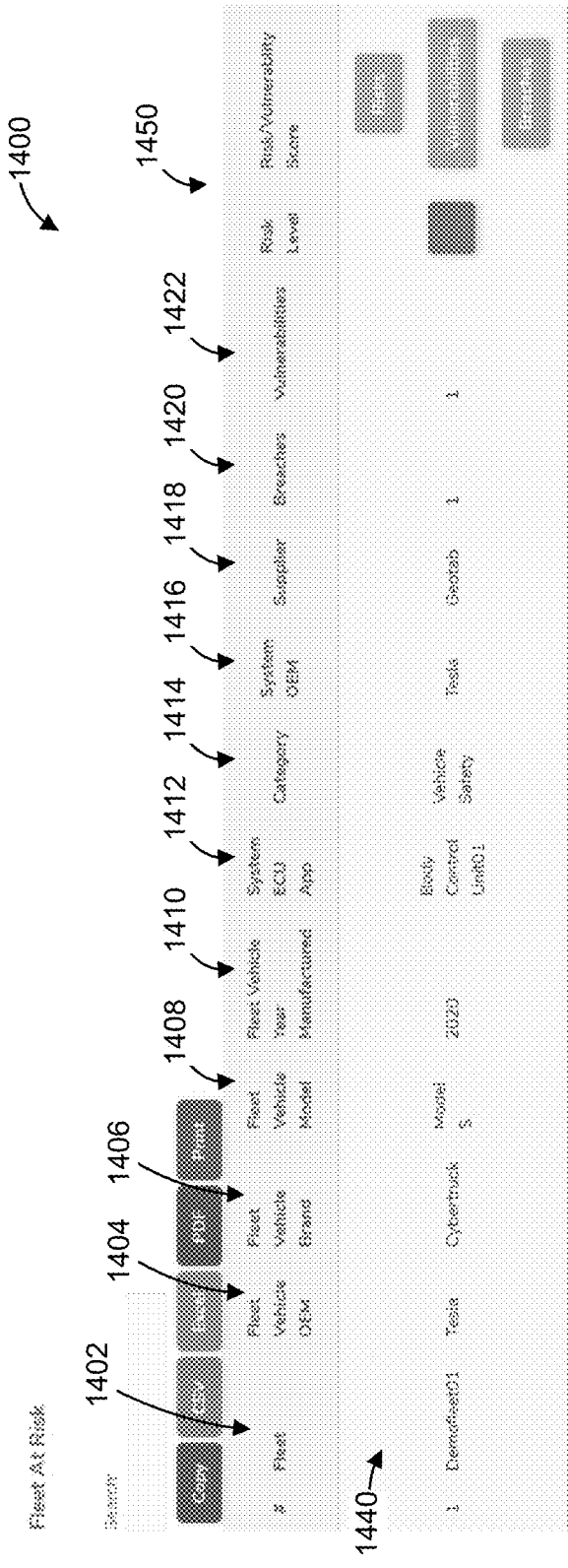
FIG. 14 is a screenshot of an example user interface for displaying a report for one or more at risk vehicles of a particular fleet using a vehicle monitoring system.

FIG. 14 shows an example fleet at risk report 1400 that contains data associated with one or more vehicles in a particular vehicle fleet associated with detected cybersecurity threats. As shown, the fleet at risk report 1400 can include various data associated with the at risk vehicles in the fleet, including the ECU models installed in the at risk vehicle fleets. Specifically, in the illustrated example, the report data includes the fleet 1402, vehicle OEM 1404, vehicle brand 1406, vehicle model 1408, year manufactured 1410, ECU model 1412, ECU category 414, OEM 1416, supplier 1418, number of breaches 1420, number of vulnerabilities 1422, and cyber risk score 1450. Again, the cyber risk score is presented as an overall risk level and a plurality of subscores for risks, vulnerabilities, and breaches. A user can select any of the subscores to obtain additional information on the subscores.

Figure 15:
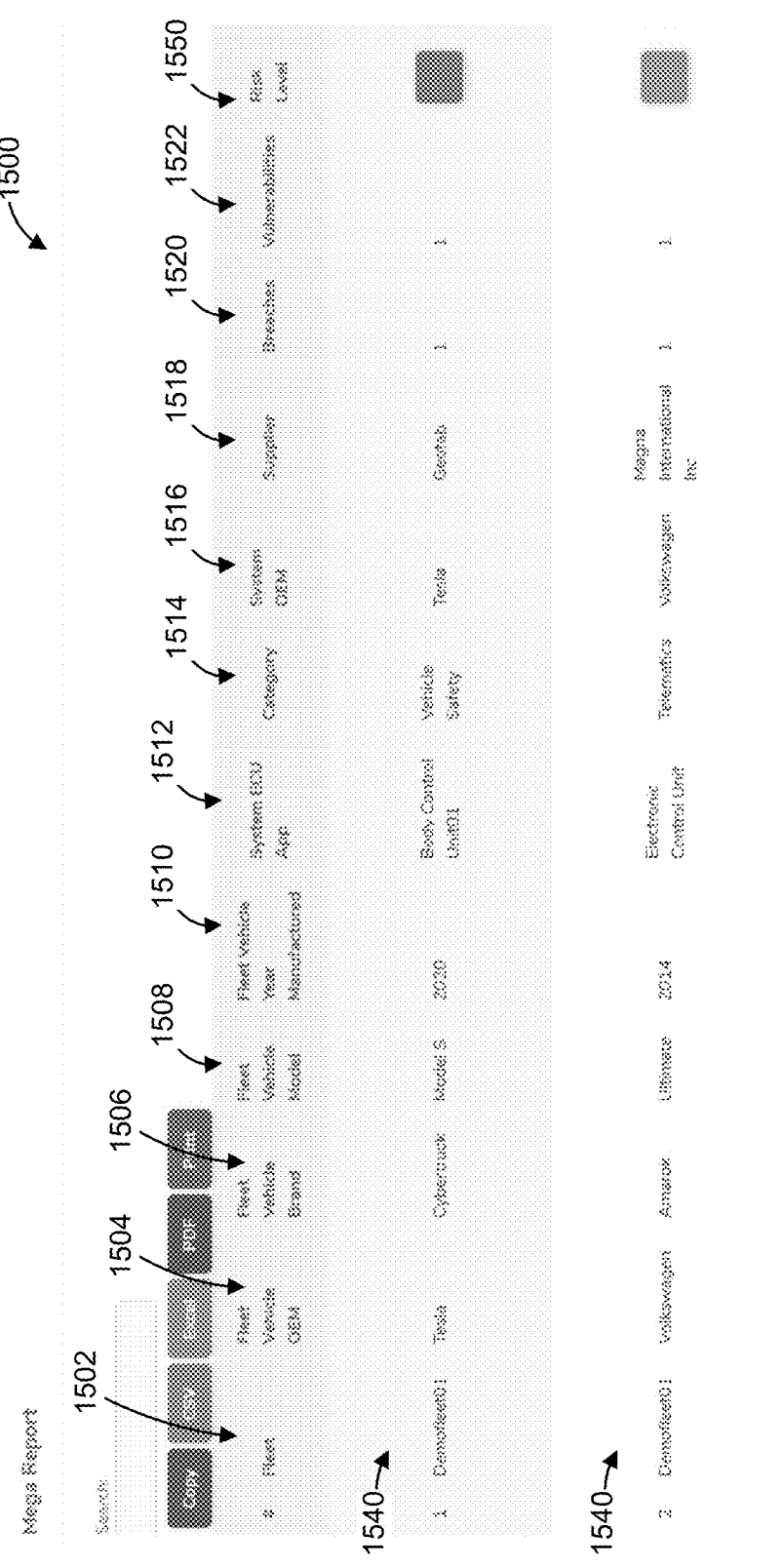
FIG. 15 is a screenshot of an example user interface for displaying a report for a particular fleet using a vehicle monitoring system.

FIG. 15 shows an example mega report 1500 that contains data associated with all vehicles fora particular fleet. In the illustrated example, the report data includes the fleet 1502, vehicle 1504, vehicle brand 1506, vehicle model 1508, year manufactured 1510, ECU model 1512, ECU category 1514, OEM 1516, supplier 1518, number of breaches 1520, number of vulnerabilities 1522, and cyber risk score 1550. Again, the cyber risk score is presented as an overall risk level and a plurality of subscores for risks, vulnerabilities, and breaches. A user can select any of the subscores to obtain additional information on the subscores.

Figure 17:
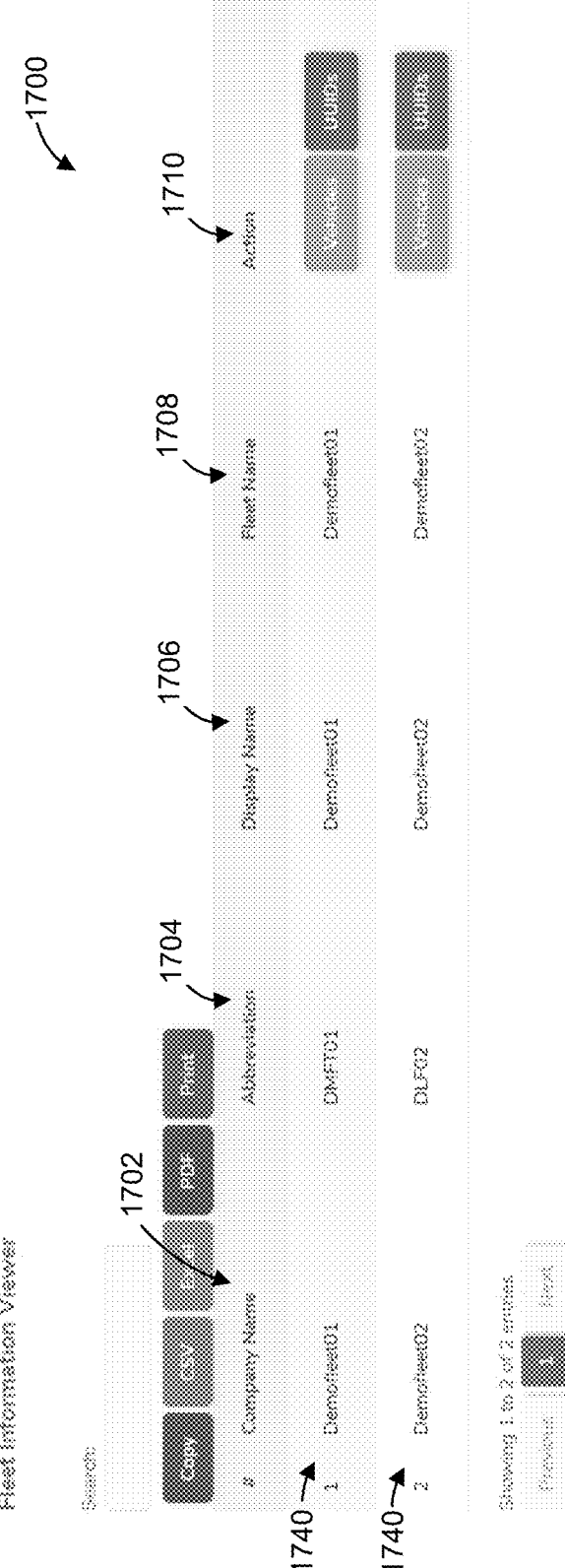
FIG. 17 is a screenshot of an example user interface for displaying vehicle fleet data using a vehicle monitoring system.

FIG. 17 shows an example fleet report 1700 that contains data associated with a plurality of vehicle fleets. In contrast to the previous reports, which are typically used by fleet owners to view data associated with a particular fleet, the fleet report 1700 is typically used by an admin user to view data associated with a plurality of fleets. In the illustrated example, the report data includes, for each fleet 1740, the fleet owner name 1702, fleet abbreviation 1704, fleet display name 1706, the fleet name 1708. A user can also use the fleet report 1700 to view the fleet identifier and data associated with the vehicles in each fleet under the action column 1710.

Figures 18A, 18B:
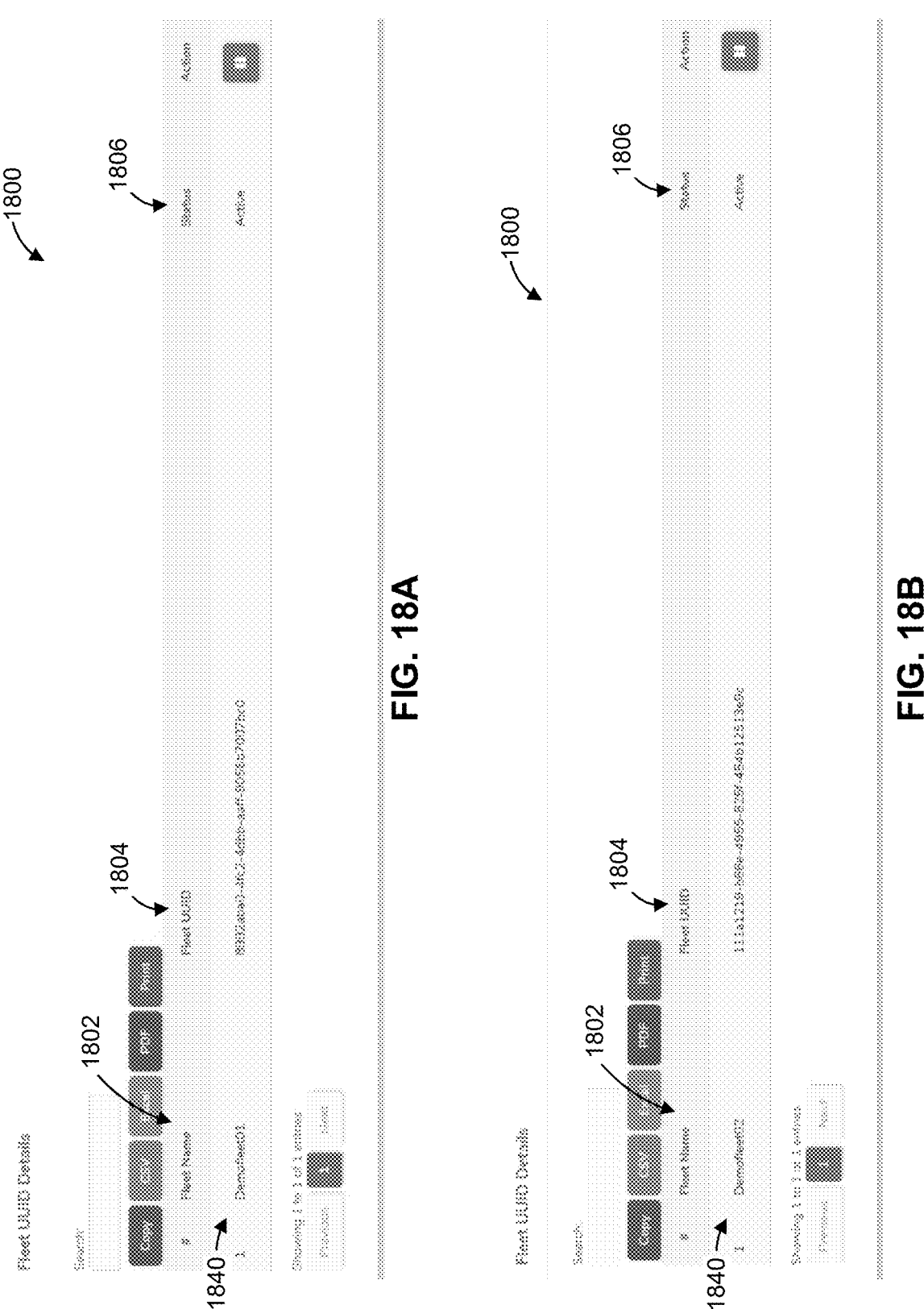
FIGS. 18A and 18B are screenshots of example user interfaces for displaying vehicle fleet data using a vehicle monitoring system.

FIGS. 18A and 18B show additional information that can be displayed in association with the fleet report 1700. In the illustrated example, the report data includes the fleet name 1802, fleet identifier 1804, and the fleet status 1806.

Figure 19:
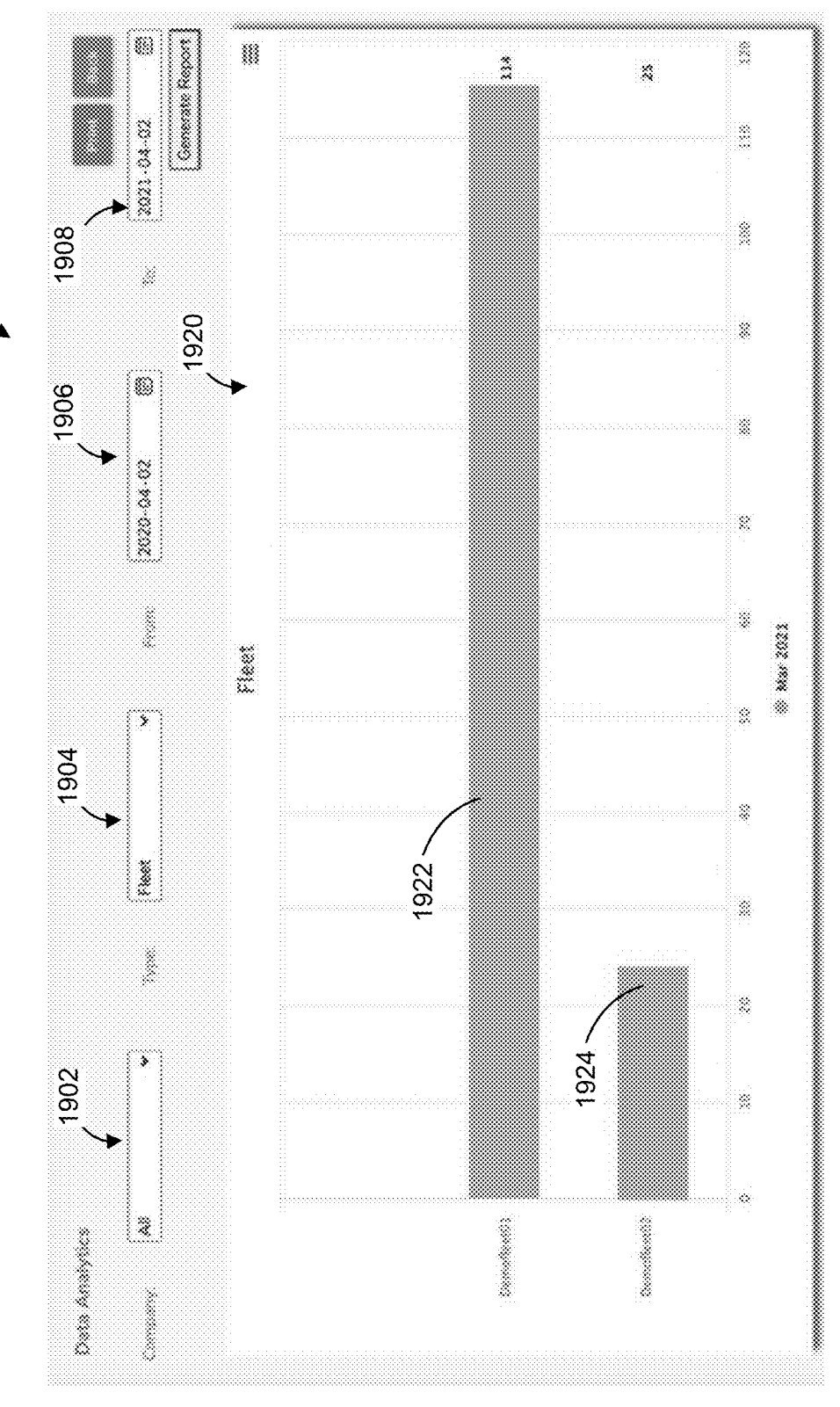
FIG. 19 is a screenshot of an example user interface for displaying vehicle fleet data using a vehicle monitoring system.

FIG. 19 shows an example data analytics report 1900 that contains data associated with a plurality of vehicle fleets. In the illustrated example, the report data includes a graph 1920 that visually displays fleet data associated with two fleets 1922 and 1924. As shown, a user can configure the data analytics report to display different types of data 1904, for different fleets 1902, and for different date ranges 1906 and 1908. For example, the graph 1920 may be configured to show the number of vulnerabilities or breaches for various fleets within a particular date range.

Referring back to FIG. 3, Subsequent to 310, the vehicle monitoring method 300 can be repeated or iterated. For example, as shown, acts 302, 304, 306, 308, and 310 can be executed more than once. In this manner, the cyber risk scores can be updated in response to new cyber risk data, additional security logs can be received, and new cybersecurity threats can be detected based on the updated cyber risk scores and additional security logs. This may allow the vehicle monitoring system 110 to continuously monitor the plurality of vehicles 120 and detect cybersecurity threats in real-time, in response to a stream of new incoming data.

Although various examples have been described with respect to security logs generated from ECUs, it should be appreciated that the vehicle monitoring systems and methods described herein may receive and process other types of vehicle data in a similar manner to monitor the vehicles. Furthermore, it should be understood that the vehicle monitoring systems and methods described herein may be used to monitor the vehicles for purposes other than cybersecurity and may be used for other types of monitoring.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by end-points herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for monitoring a plurality of vehicles, each vehicle comprising at least one electronic control unit (ECU), each ECU operable to monitor at least one vehicular subsystem of the corresponding vehicle, the method comprising operating at least one processor to:

determine, based on cyber risk data corresponding to a plurality of ECU models, a cyber risk score for each ECU model, the cyber risk score indicating a probability of a cybersecurity threat for the ECU model;

receive, from each of the vehicles, one or more security logs, each security log comprising one or more time-stamped events recorded by an ECU of the corresponding vehicle;

for each timestamped event of the one or more time-stamped events, determine i.) the ECU model of the ECU that recorded the timestamped event, and ii.) associate the cyber risk score of the ECU model with the timestamped event;

evaluate the one or more security logs to detect at least one cybersecurity threat in at least some of the vehicles by, for each timestamped event:

evaluating a severity level associated with the time-stamped event to determine whether the severity level satisfies a minimum threat level;

evaluating the cyber risk score associated with the timestamped event to determine whether the cyber risk score satisfies a minimum risk level; and indicating the at least one cybersecurity threat is present when at least one of the severity level satisfies the minimum threat level and the cyber risk score satisfies the minimum risk level; and in response to detecting the at least one cybersecurity threat, transmit an alert indicating at least one vehicle corresponding to the at least one security log experienced the at least one cyber security threat.

2. The method of claim 1, wherein the alert further indicates at least one ECU model corresponding to the at least one security log.

3. The method of claim 1, wherein the cyber risk data is received from one or more external data sources.

4. The method of claim 1, wherein the cyber risk data indicates, for each ECU model, at least one cybersecurity control status of i.) the ECU model, and ii.) a manufacturer of the ECU model.

5. The method of claim 1, wherein the cyber risk data indicates, for each ECU model, known vulnerabilities and breaches associated with the ECU model.

6. The method of claim 1, further comprising operating the at least one processor to:

for each security log, append a vehicle identifier to the security log, the vehicle identifier identifying the vehicle from which the security log was received; and

wherein the alert indicates the at least one vehicle corresponding to the at least one security log based on the corresponding vehicle identifier.

7. The method of claim 6, wherein the cybersecurity threat is detected further based on the vehicle identifier of the at least one security log.

8. The method of claim 1, wherein the plurality of vehicles comprises one or more vehicle fleets, and the method further comprises operating the at least one processor to:

for each security log, append a fleet identifier to the security log, the fleet identifier identifying the vehicle fleet of the vehicle from which the security log was received; and wherein the alert further indicates the vehicle fleet corresponding to the at least one security log based on the corresponding fleet identifier.

9. The method of claim 8, wherein the cybersecurity threat is detected further based on the fleet identifier of the at least one security log.

10. The method of claim 1, wherein the cybersecurity threat is detected in response to determining that at least one event in at least one security log meets a security log condition that is determined based on the at least one cyber risk score corresponding to the at least one security log.

11. A non-transitory computer readable medium having instructions stored thereon executable by at least one processor to implement the method of claim 1.

12. The method of claim 1 further comprises operating the at least one processor to, prior to evaluating the one or more security logs, convert the one or more security logs into a predefined format to provide the one or more timestamped events in a consistent format;

evaluate each converted security log to determine whether additional data is required to be appended to provide sufficient data for detecting the at least one cybersecurity threat; and in response to determining the additional data is required, appending one or more data fields to the converted security log.

13. A system for monitoring a plurality of vehicles, each vehicle comprising at least one electronic control unit (ECU), each ECU operable to monitor at least one vehicular subsystem of the corresponding vehicle, the system comprising:

at least one processor in communication with the plurality of vehicles, the at least one processor operable to:

determine, based on cyber risk data corresponding to a plurality of ECU models, a cyber risk score for each ECU model, the cyber risk score indicating a probability of a cybersecurity threat for the ECU model;

receive, from each of the vehicles, one or more security logs, each security log comprising one or more timestamped events recorded by an ECU of the corresponding vehicle;

for timestamped event of the one or more timestamped events, determine i.) the ECU model of the ECU that recorded the timestamped event, and ii.) associate the cyber risk score of the ECU model with the timestamped event;

evaluate the one or more security logs to detect at least one cybersecurity threat in at least some of the vehicles by, for each timestamped event:

evaluating a severity level associated with the timestamped event to determine whether the severity level satisfies a minimum threat level;

evaluating the cyber risk score associated with the timestamped event to determine whether the cyber risk score satisfies a minimum risk level; and indicating the at least one cybersecurity threat is present when at least one of the severity level satisfies the minimum threat level and the cyber risk score satisfies the minimum risk level; and in response to detecting the at least one cybersecurity threat, transmit an alert indicating at least one vehicle corresponding to the at least one security log experienced the at least one cybersecurity threat.

14. The system of claim 13, wherein the alert further indicates at least one ECU model corresponding to the at least one security log.

15. The system of claim 13, wherein the cyber risk data is received from one or more external data sources.

16. The system of claim 13, wherein the cyber risk data indicates, for each ECU model, at least one cybersecurity control status of i.) the ECU model, and ii.) a manufacturer of the ECU model.

17. The system of claim 13, wherein the cyber risk data indicates, for each ECU model, known vulnerabilities and breaches associated with the ECU model.

18. The system of claim 13, wherein the at least one processor is operable to:

for each security log, append a vehicle identifier to the security log, the vehicle identifier identifying the vehicle from which the security log was received; and wherein the alert indicates the at least one vehicle corresponding to the at least one security log based on the corresponding vehicle identifier.

19. The system of claim 18, wherein the cybersecurity threat is detected further based on the vehicle identifier of the at least one security log.

20. The system of claim 13, wherein the plurality of vehicles comprises one or more vehicle fleets, and the at least one processor is operable to:

for each security log, append a fleet identifier to the security log, the fleet identifier identifying the vehicle fleet of the vehicle from which the security log was received; and wherein the alert further indicates the vehicle fleet corresponding to the at least one security log based on the corresponding fleet identifier.

21. The system of claim 20, wherein the cybersecurity threat is detected further based on the fleet identifier of the at least one security log.

22. The system of claim 13, wherein the at least one processor is operable to:

reformat at least some of the security logs so that each security log has the same format.

23. The system of claim 13, wherein the at least one processor is operable to, prior to evaluating the one or more security logs, convert the one or more security logs into a predefined format to provide the one or more timestamped events in a consistent format;

evaluate each converted security log to determine whether additional data is required to be appended to provide sufficient data for detecting the at least one cybersecurity threat; and in response to determining the additional data is required, appending one or more data fields to the converted security log.

* * * * *